United States Patent
Yasuda

(10) Patent No.: US 8,260,531 B2
(45) Date of Patent: Sep. 4, 2012

(54) ABNORMALITY DETECTION DEVICE FOR IN-CYLINDER PRESSURE SENSOR, ABNORMALITY DETECTION METHOD FOR IN-CYLINDER PRESSURE SENSOR AND CONTROL APPARATUS FOR INTERNAL COMBUSTION ENGINE

(75) Inventor: Hiromichi Yasuda, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 13 days.

(21) Appl. No.: 13/126,959

(22) PCT Filed: Nov. 13, 2009

(86) PCT No.: PCT/JP2009/069373
§ 371 (c)(1),
(2), (4) Date: Apr. 29, 2011

(87) PCT Pub. No.: WO2010/058743
PCT Pub. Date: May 27, 2010

(65) Prior Publication Data
US 2011/0303190 A1    Dec. 15, 2011

(30) Foreign Application Priority Data

Nov. 19, 2008 (JP) .................................. 2008-295992

(51) Int. Cl.
 G06F 19/00 (2011.01)
 G06G 7/70 (2006.01)
 G01M 15/00 (2006.01)
(52) U.S. Cl. ...................... 701/114; 123/435; 73/114.18
(58) Field of Classification Search .................. 701/114; 702/182, 183, 185, 189, 190; 123/435; 73/114.16, 73/114.18
See application file for complete search history.

(56) References Cited

U.S. PATENT DOCUMENTS 4,711,119 A * 12/1987 Hamren ..................... 73/114.18
5,276,625 A * 1/1994 Nakaniwa ..................... 701/111
(Continued)

FOREIGN PATENT DOCUMENTS

DE          41 27 950 A1       3/1992
(Continued)

OTHER PUBLICATIONS

Office Action issued May 8, 2012 in DE Application No. 11 2009 003 611.2.
(Continued)

Primary Examiner — Willis R Wolfe, Jr.
Assistant Examiner — Anthony L Bacon
(74) Attorney, Agent, or Firm — Kenyon & Kenyon LLP

(57) ABSTRACT

An object of the present invention is to provide an abnormality detection device for an in-cylinder pressure sensor and an abnormality detection method for an in-cylinder pressure sensor that is able to detect preload loss abnormality of an in-cylinder pressure sensor.

An in-cylinder pressure sensor has a strain gauge element to which preload was given. Under an operating state of an internal-combustion engine, it is judged whether Pim/Pex that is a ratio of intake pressure Pim to exhaust gas pressure Pex is 1. Reset of temperature drift is performed when Pim/Pex is 1. If an output voltage which serves as a base of calculation of Pim after the reset of a temperature drift is equal to a circuit limit value, existence of preload loss abnormality is determined.

15 Claims, 12 Drawing Sheets

U.S. PATENT DOCUMENTS

| | | | |
|---|---|---|---|
| 6,684,151 B1 * | 1/2004 | Ring | 701/110 |
| 7,542,865 B2 * | 6/2009 | Hoshi et al. | 702/106 |
| 2006/0032472 A1 * | 2/2006 | Yamada et al. | 123/145 A |

FOREIGN PATENT DOCUMENTS

| | | |
|---|---|---|
| DE | 102 33 583 A1 | 2/2004 |
| JP | 7-29436 U | 6/1995 |
| JP | 7-301145 A | 11/1995 |
| JP | 8-004565 A | 1/1996 |
| JP | 11-247708 A | 9/1999 |
| JP | 2005-291091 A | 10/2005 |
| JP | 2005-330904 A | 12/2005 |
| JP | 2006-010624 A | 1/2006 |
| JP | 2006-064675 A | 3/2006 |
| JP | 2007-113473 A | 5/2007 |
| JP | 2007-327502 A | 12/2007 |

OTHER PUBLICATIONS

International Preliminary Report on Patentability issued Jun. 30, 2011.

\* cited by examiner

ABNORMALITY DETECTION DEVICE FOR IN-CYLINDER PRESSURE SENSOR, ABNORMALITY DETECTION METHOD FOR IN-CYLINDER PRESSURE SENSOR AND CONTROL APPARATUS FOR INTERNAL COMBUSTION ENGINE

This is a 371 national phase application of PCT/JP2009/069373 filed 13 Nov. 2009, claiming priority to Japanese Patent Application No. JP 2008-295992 filed 19 Nov. 2008, the contents of which are incorporated herein by reference.

TECHNICAL FIELD

The present invention relates to an abnormality detection device for an in-cylinder pressure sensor, abnormality detection method for an in-cylinder pressure sensor and a control apparatus for an internal combustion engine.

BACKGROUND ART

An in-cylinder pressure sensor for the purpose of measurement of in-cylinder pressure of an internal combustion engine is known as disclosed, for instance, in JP-A-2005-291091. There are several types of in-cylinder pressure sensors such as a piezo-electric type in-cylinder pressure sensor in which a piezo-electric element is used as a pressure sensing element or a strain gage type in-cylinder pressure sensor in which a strain gage is used as a pressure sensing element. Generally, these types of in-cylinder pressure sensors are designed, manufactured or installed so that preload is provided to its pressure sensing element for the purpose of high accuracy measurement of in-cylinder pressure when the in-cylinder pressure sensor is attached to an internal combustion engine. A piezo-electric element in the following patent document 1 is attached to a cylinder head of an internal combustion engine so that preload is provided as described above.
    Patent Document 1: JP-A-2005-291091
    Patent Document 2: JP-A-7-301145
    Patent Document 3: JP-A-2007-327502
    Patent Document 4: JP-A-2005-330904
    Patent Document 5: JP-A-7-29436
    Patent Document 6: JP-A-2006-64675

SUMMARY OF INVENTION

Technical Problem

The inventor found out following knowledge as a result of earnest study. That is, rapid combustion in abnormal combustion, such as a knocking, may cause impulsive force in an operation of an internal combustion engine. Also, in-cylinder pressure may become very large as compared with usual operation. Thereby, rapid impulsive force or excessive pressure is applied to an in-cylinder pressure sensor. The influence of those impulsive force or excessive pressure may become so large that a plastic deformation occurs in the in-cylinder pressure sensor. Depending to the direction or the grade of this plastic deformation, configuration of the in-cylinder pressure sensor may be transformed so as to reduce preload of its pressure sensing element. If preload is reduced, the output sensitivity improved by the preload will fall, and as a result of this, trouble may occur in in-cylinder-pressure measurement. With respect to detection of abnormality of an in-cylinder pressure sensor caused by such preload loss, neither conventional arts have disclosed any effective techniques.

The present invention has been made to solve the above problem. An object of the present invention is to provide an abnormality detection device for an in-cylinder pressure sensor and an abnormality detection method for an in-cylinder pressure sensor that is able to detect preload loss abnormality of an in-cylinder pressure sensor.

Other object of the present invention is to provide a control apparatus for an internal combustion engine that is able to suppress a harmful effect to the operational state of an internal combustion engine caused by preload loss abnormality in an in-cylinder pressure sensor.

Solution to Problem

To achieve the above-mentioned purpose, a first aspect of the present invention is an abnormality detection device for an in-cylinder pressure sensor comprising:
    obtaining means for obtaining an output from the in-cylinder pressure sensor, the in-cylinder pressure sensor including an pressure sensing element, the pressure sensing element being provided with preload;
    output abnormality detecting means for detecting existence or nonexistence of dead band in output characteristic of the in-cylinder pressure sensor;
    drift reset means for performing reduction or cancellation of output drift of the in-cylinder pressure sensor; and
    preload loss abnormality detecting means for detecting existence or nonexistence of preload loss abnormality on a basis of existence or nonexistence of the dead band in the output characteristic of the in-cylinder pressure sensor after the drift reset means performs the reduction or the cancellation of the output drift.

A second aspect of the present invention is the abnormality detection device for an in-cylinder pressure sensor according to the first aspect of the present invention, wherein
    the drift reset means includes abnormal circumstance drift reset means, the abnormal circumstance drift reset means performs reduction or cancellation of output drift of the in-cylinder pressure sensor when the output abnormality detecting means detects the existence or nonexistence of the dead band;
    the preload loss abnormality detecting means detecting existence or nonexistence of preload loss abnormality on a basis of existence or nonexistence of the dead band in the output characteristic of the in-cylinder pressure sensor after the abnormal circumstance drift reset means performs the reduction or the cancellation of the output drift.

A third aspect of the present invention is the abnormality detection device for an in-cylinder pressure sensor according to the second aspect of the present invention, wherein
    the output abnormality detecting means detects, in the output characteristic, dead band that prevents measurement of at least one of intake pressure and exhaust pressure in a measurement target cylinder.

A fourth aspect of the present invention is the abnormality detection device for an in-cylinder pressure sensor according to any one of the first to third aspects of the present invention, wherein
    the drift reset means performs reduction or cancellation of output drift so that measurement of at least lower one of intake pressure and exhaust pressure becomes possible;
    the preload loss abnormality detecting means detecting existence or nonexistence of preload loss abnormality after the abnormal circumstance drift reset means performs the reduction or the cancellation of the output drift, on a basis of existence or nonexistence of dead band that prevents measurement of at least one of intake pressure and exhaust pressure in a measurement target cylinder.

A fifth aspect of the present invention is the abnormality detection device for an in-cylinder pressure sensor according to any one of the first to fourth aspects of the present invention, further comprising:

intake stroke in-cylinder pressure obtaining means for obtaining intake stroke in-cylinder pressure, the intake stroke in-cylinder pressure being in-cylinder pressure in a measurement target cylinder in an intake stroke; and exhaust stroke in-cylinder pressure obtaining means for obtaining exhaust stroke in-cylinder pressure, the exhaust stroke in-cylinder pressure being in-cylinder pressure in the measurement target cylinder in an exhaust stroke; wherein the output abnormality detecting means includes pressure ratio abnormality detecting means, the pressure ratio abnormality detecting means detects the dead band on a basis of a ratio of the in-cylinder pressure and the intake stroke in-cylinder pressure.

A sixth aspect of the present invention is the abnormality detection device for an in-cylinder pressure sensor according to the fifth aspect of the present invention, further comprising:

condition judgment means for judging whether the internal combustion engine is under a condition that a difference of in-cylinder pressure in intake stroke and in-cylinder pressure in exhaust stroke is greater than the difference of normal operation condition; wherein the pressure ratio abnormality detecting means detects existence or nonexistence of the dead band in a case where the condition judgment means judges that the difference of in-cylinder pressure in intake stroke and in-cylinder pressure in exhaust stroke is greater.

A seventh aspect of the present invention is the abnormality detection device for an in-cylinder pressure sensor according to the fifth aspect of the present invention, further comprising:

fuel-cut detecting means for detecting whether or not a fuel-cut is performed in the internal combustion engine; and closing means for closing an intake passage of the internal combustion engine when the fuel-cut is performed; wherein the pressure ratio abnormality detecting means detects the dead band when the intake passage being closed.

An eighth aspect of the present invention is the abnormality detection device for an in-cylinder pressure sensor according to any one of the fifth to seventh aspects of the present invention, wherein the output abnormality detecting means detects existence of the dead band on a basis of a result of detection by the pressure ratio abnormality detecting means and value of output or change of output from the in-cylinder pressure sensor in intake stroke.

A ninth aspect of the present invention is the abnormality detection device for an in-cylinder pressure sensor according to any one of the first to eighth aspects of the present invention, wherein the preload loss abnormality detecting means detects existence or nonexistence of preload loss abnormality on a basis of a comparison of an output value from the in-cylinder pressure sensor after the reduction or the cancellation of the output drift by the drift reset means and an output limitation value being an upper limit value or a lower limit value of a range of output signal from the in-cylinder pressure sensor.

A tenth aspect of the present invention is the abnormality detection device for an in-cylinder pressure sensor according to any one of the first to eighth aspects of the present invention, wherein the preload loss abnormality detecting means detects existence or nonexistence of preload loss abnormality on a basis of rate of change of output from the in-cylinder pressure sensor in intake stroke of a measurement target cylinder after the reduction or the cancellation of the output drift by the drift reset means.

An eleventh aspect of the present invention is a control apparatus for an internal combustion engine comprising:

an in-cylinder pressure sensor including a pressure sensing element, the pressure sensing element being provided with preload;

control means for controlling the internal combustion engine by using output from the in-cylinder pressure sensor;

the abnormality detection device for an in-cylinder pressure sensor according to any one of the first to eighth aspects of the present invention; and restriction means for restricting the control means to non-use of output from the in-cylinder pressure sensor when preload loss abnormality in the in-cylinder pressure sensor is detected.

A twelfth aspect of the present invention is the control apparatus for an internal combustion engine according to the eleventh aspect of the present invention, wherein the restriction means includes parameter computation means, the parameter computation means computes a parameter relating to control of the internal combustion engine by using a part of output from the in-cylinder pressure sensor, and the restriction means including:

influence judgment means for judging whether influence of preload loss abnormality exists in the part of output used by the parameter computation means, and sensor output use restriction means for performing, in case where the influence of preload loss abnormality exists in the part of output used by the parameter computation means, prohibition of computation on a bases of the output from the in-cylinder pressure sensor in the parameter computation means or prohibition of control on a basis of the parameter computed by the parameter computation means.

To achieve the above-mentioned purpose, a thirteenth aspect of the present invention is an abnormality detection method for an in-cylinder pressure sensor, the in-cylinder pressure sensor including an pressure sensing element, the pressure sensing element being provided with preload, being characterized by: detecting existence or nonexistence of preload loss abnormality on a basis of existence or nonexistence of a dead band remaining in output characteristic of an in-cylinder pressure sensor after performing drift compensation to the in-cylinder pressure sensor.

Advantageous Effects of Invention

The first aspect of the present invention makes it possible to detect preload loss abnormality of in-cylinder pressure sensor. That is, preload loss generates a dead band in the output characteristic of an in-cylinder pressure sensor. The dead band originates in reduction of preload in the in-cylinder pressure sensor. On the other hand, the temperature variation in the circumstance of an in-cylinder pressure sensor, or the like, may cause average level of output of the in-cylinder pressure sensor to rise or fall to the grade that produces a dead band (it is called "output drift"). Such output drift can be canceled by installing drift compensation to the in-cylinder pressure sensor. However, preload loss abnormality is unrecoverable by the drift compensation since preload loss abnormality is an abnormality causing in hardware of the in-cylinder pressure sensor. At this point, the first aspect of the present invention includes the means for detecting existence or nonexistence of preload loss abnormality on a basis of output abnormality in output characteristic of an in-cylinder pressure sensor after output drift compensation is performed. Thereby, it becomes possible to detect that the output abnormality is caused by preload loss abnormality.

In the second aspect of the present invention, the reduction or cancellation of the output drift in an in-cylinder pressure sensor is implemented when a dead band is detected by the output abnormality detection means, and then, the preload loss abnormality detection means performs detection of the abnormalities of a preload loss. Thereby, detection can be performed quickly and certainly with respect to the generated dead band which cannot be solved by output drift compensation.

According to the third aspect of the present invention, preload loss abnormality in an in-cylinder pressure sensor can be detected quickly. That is, intake pressure and exhaust pressure are relatively low among in-cylinder pressures in one combustion cycle. Because of the property of preload loss abnormality, the influence of preload loss abnormality firstly produces measurement prevention of intake pressure or exhaust pressure with high possibility. The third aspect of the present invention can quickly detect that preload loss abnormality may have occurred, by detecting the existence of the dead band in intake pressure or exhaust pressure. Thereby, according to the third aspect, preload loss abnormality of the in-cylinder pressure sensor can be detected quickly.

According to the fourth aspect of the present invention, preload loss abnormality in an in-cylinder pressure sensor can be detected certainly. That is, according to the fourth aspect, output drift is sufficiently solved to the grade which allows measurement of a lower one of intake pressure and exhaust pressure. That is, a sufficient measure against the output drift is certainly performed. Then, preload loss abnormality detection can be performed on the basis of existence or nonexistence of dead band in output characteristic from which the output drift sufficiently reduced. Thereby, preload loss abnormality in the in-cylinder pressure sensor can be detected certainly.

According to the fifth aspect of the present invention, detection of output abnormality of the in-cylinder pressure sensor can be performed on the basis of the ratio of intake pressure and exhaust pressure obtained from the output of the in-cylinder pressure sensor. In an internal combustion engine in which intake air amount control is performed, difference of exhaust pressure and intake pressure are, in general, sufficiently large. Therefore, the value of the ratio of them can be a basis for detecting whether or not dead band exists in both of an intake pressure side and an exhaust pressure side of output characteristic.

According to the sixth aspect of the present invention, detection of output abnormality based on the ratio of intake pressure and exhaust pressure can be performed in a state where the difference of intake pressure and exhaust pressure is greater than the difference of normal operation condition. Thereby, accuracy can be improved in output abnormality detection on the basis of the ratio of intake pressure and exhaust pressure.

According to the seventh aspect of the present invention, detection of output abnormality based on the ratio of intake pressure and exhaust pressure can be performed under intake-passage-closing-condition in that the difference of intake pressure and exhaust pressure is still greater. Thereby, accuracy can be improved in output abnormality detection on the basis of the ratio of intake pressure and exhaust pressure.

The eighth aspect of the present invention can certainly detect a case in that preload loss only prevents intake pressure measurement as a target for a judgment of preload loss abnormality. That is, if the degree of preload loss is markedly large, the sensitivity of the pressure sensing element will fall so that measurement of both intake pressure and exhaust pressure is prevented. However, preload loss may occur so that exhaust pressure measurement is not prevented but intake pressure measurement is prevented. The eighth aspect of the present invention makes it possible not to miss the above case in the output abnormality detection.

The ninth aspect of the present invention can perform detection of existence or nonexistence of the dead band used for preload loss abnormality detection, on the basis of the size of the output value from the in-cylinder pressure sensor.

The tenth aspect of the present invention achieves following advantage. That is, the output from the in-cylinder pressure sensor should keep a constant value substantially while a dead band has occurred in the in-cylinder pressure sensor except for a change by a noise or the like. If a dead band occurs by preload loss, the dead band will appear at first in an intake stroke where a pressure value is low (normally, negative pressure). Therefore, existence of the dead band of an in-cylinder pressure sensor is detectable on the basis of the rate of change of the output from the in-cylinder pressure sensor in an intake stroke. Furthermore, by using the rate of change of the output from the in-cylinder pressure sensor as a base of detection, the dead band of an in-cylinder pressure sensor can be detected in common under a plurality of situations where the output value in a dead band is different each other. That is, according to the tenth aspect of the present invention, it is possible to deal with a plurality of situations where the output value in each dead band region is different.

According to the eleventh aspect of the present invention, when preload loss abnormality is detected by the abnormality detection device for an in-cylinder pressure sensor according to any one of the first to eleventh aspects of the present invention, use of the output from the in-cylinder pressure sensor can be, partially or completely, restricted. This makes it possible to suppress that the output from the in-cylinder pressure sensor including preload loss abnormality causes a harmful effect in the control of internal combustion engine. Thereby, the harmful effect in the control of internal combustion engine by preload loss abnormality can be suppressed.

The twelfth aspect of the present invention makes it possible not to use the output from the in-cylinder pressure sensor including an influence of preload loss abnormality in the parameter computation means. Furthermore, if an influence of preload loss abnormality exists in a region where the parameter computation means does not use, the twelfth aspect can regard such abnormality as allowable abnormality. This achieves continuous use of the output of the in-cylinder pressure sensor as far as the output is usable while suppressing a harmful effect in the control of an internal combustion engine.

The thirteenth aspect of the present invention makes it possible to detect preload loss abnormality of in-cylinder pressure sensor. That is, the output drift can be compensated by drift compensation to the in-cylinder pressure sensor. However, preload loss abnormality is unrecoverable by the drift compensation since preload loss abnormality is a hardware abnormality of the in-cylinder pressure sensor. The thirteenth aspect of the present invention can detect preload loss abnormality of in-cylinder pressure sensor on the basis of existence or nonexistence of a dead band remaining in output characteristic of an in-cylinder pressure sensor after performing output drift compensation.

BRIEF DESCRIPTION OF DRAWINGS

FIG. 4 is a schematic diagram for explaining the difference between preload loss abnormality and the simple output offset resulting from a temperature drift or the like.

DESCRIPTION OF EMBODIMENTS

First Embodiment
[Configuration of First Embodiment]
(System Configuration of Internal Combustion Engine)

Figure 1:
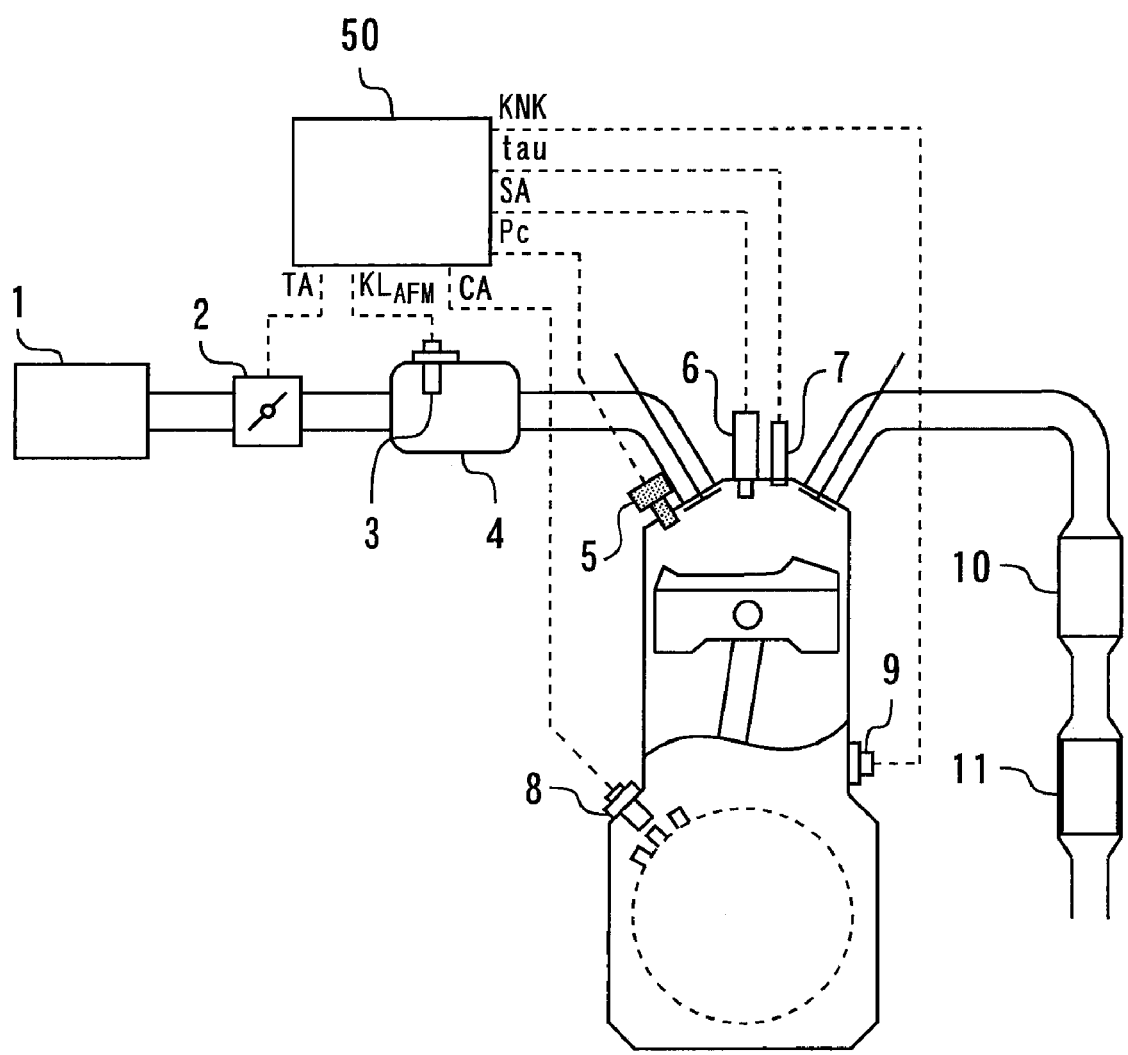
FIG. 1 illustrates a premise configuration of an internal combustion engine according to a first embodiment.

FIG. 1 illustrates a premise configuration of an internal combustion engine according to a first embodiment. In the first embodiment, abnormality detection device for the in-cylinder pressure sensor according to the present invention is installed in the internal combustion engine illustrated in FIG. 1. Although FIG. 1 illustrates only one cylinder for convenience, the present invention is applicable to a multi-cylinder internal combustion engine.

The internal combustion engine illustrated in FIG. 1 includes an air cleaner 1, a throttle valve 2, the air flow meter 3, a surge tank 4 in an intake passage. The downstream of the surge tank 4 communicates to a combustion chamber via a intake port and an intake valve. Besides, the internal combustion engine illustrated in FIG. 1 includes an in-cylinder pressure sensor 5, a spark plug 6, and a fuel direct injection injector 7 in the internal combustion engine upper part, i.e. cylinder head side. The internal combustion engine illustrated in FIG. 1 has a crank angle sensor 8 and a knock sensor 9. The internal combustion engine illustrated in FIG. 1 also has a catalyst 10 and a catalyst 11 in an exhaust passage, respectively. It should be noted that an exhaust gas sensor, such as an air fuel ratio sensor, is also provided although its illustration is omitted.

The internal-combustion engine of FIG. 1 has an ECU (Electronic Control Unit) 50. An opening angle of the throttle valve 2, an intake air amount $KL_{AFM}$, a crank angle CA based on the crank angle sensor 8, an in-cylinder pressure $P_C$ based on the in-cylinder pressure sensor 5, and an output KNK of the knock sensor 9 are inputted to the ECU 50. The ECU 50 also controls the spark plug 6 and the fuel direct injection injector 7 based on various kinds of control parameters, such as ignition timing SA and the rate of fuel injection tau.

(Configuration of the In-Cylinder Pressure Sensor 5)

Figure 2:
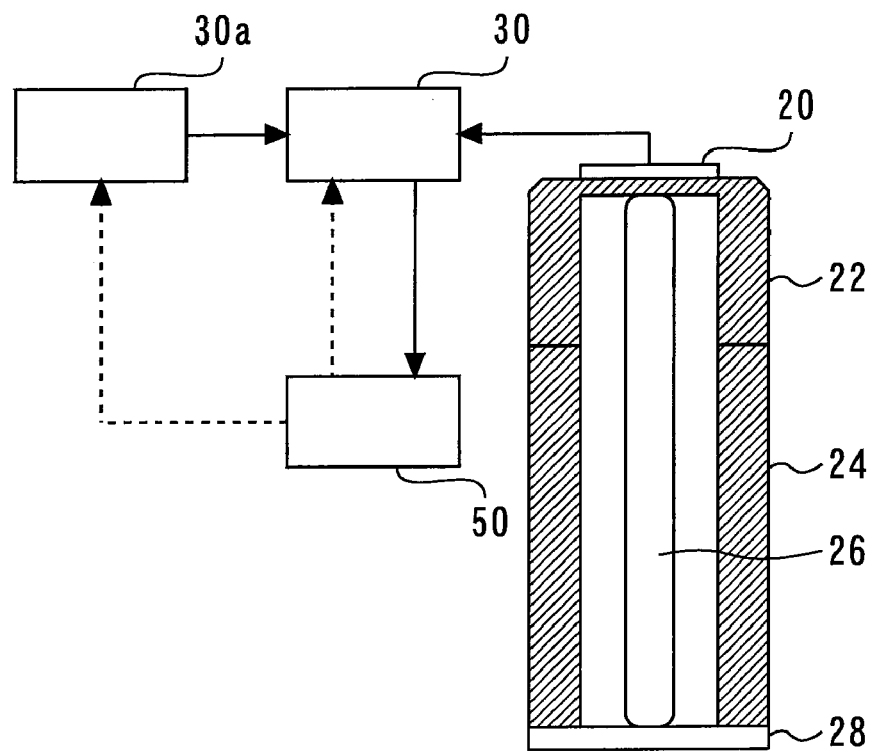
FIG. 2 is a schematic cross-sectional view of the chief part of the in-cylinder pressure sensor 5.

FIG. 2 is a schematic cross-sectional view of the chief part of the in-cylinder pressure sensor 5. The in-cylinder pressure sensor 5 includes a strain gage element 20 that changes a voltage value in accordance with pressure. The strain gage element 20 is provided with a housing 22. As illustrated in FIG. 2, the housing 22 and a housing 24 are welded together, and the housing 24 is also united with a pressure sensing diaphragm 28. A transmission rod 26 is included in the inner space formed of the housing 22 and the housing 24.

The strain gage element 20 is, in the first embodiment, a silicon chip type element. A load is provided to the strain gage element 20 in its manufacturing process. The strain gage element 20 has received a load which is previously provided (hereinafter, referred to as a "preload"), when mounted to the internal combustion engine being installed in the in-cylinder pressure sensor 5. The preload is mainly given for the purpose of a zero point offset adjustment. That is, the preload is given to the strain gage element 20 for adjusting output characteristic of the in-cylinder pressure sensor 5 based on an output value under a situation where the in-cylinder pressure is 0 [MPa]. Since the preload is given, the strain gage element 20 can output voltages in accordance with pressure with sufficient accuracy within a full range of pressure arising in a target cylinder for measurement of in-cylinder pressure during a combustion cycle. It should be noted that a target cylinder of in-cylinder pressure measurement is simply referred to as a "measurement target cylinder", hereinafter.

The in-cylinder pressure sensor 5 is positioned so that the lowerside portion in FIG. 2 faces the combustion chamber. When the pressure sensing diaphragm 28 receives pressure in the cylinder, the pressure reaches finally to the side of the strain gage element 20 via the transmission rod 26. At the result of this, the strain gage element 20 becomes to be strained, then the voltage value of the in-cylinder pressure sensor 5 changes. The voltage value can be used as the basis of in-cylinder pressure measurement.

A circuit unit 30 and a drift reset unit 30a are illustrated in FIG. 2 as a block diagram. The output from the strain gage element 20 is inputted to the circuit unit 30. The circuit unit 30 serves to output the change of electronic signal from the strain gage element 20 as the output of the in-cylinder pressure sensor 5 to the outside. Also, in the first embodiment, the drift reset unit 30a is provided to cancel the influence of temperature drift. The circuit unit 30 and the drift reset unit 30a are connected to the ECU 50.

It is known that, so called as "output drift", an increase or a decrease of average level of output from a in-cylinder pressure sensor may be caused by, for example, a change of temperature or the like in the vicinity of the in-cylinder pressure sensor. The drift according to the temperature change is called a temperature drift. It is normally regarded as a problem that the output level from an in-cylinder pressure sensor shifts by the temperature drift. In the first embodiment, the circuit unit 30 includes the drift reset unit 30a in order to cope with the temperature drift of the in-cylinder pressure sensor 5. Furthermore, a function for the temperature drift detection is installed in the ECU 50. In the first embodiment, the ECU 50 controls the drift reset unit 30a as necessary, and this achieves compensation by drift compensation.

It should be noted that the configuration for cancellation of drift reset in an in-cylinder pressure sensor is not limited. That is, various types of conventional peripheral circuits or drift compensation techniques according to the configuration of in-cylinder pressure sensor, whether hardware type or software type, are known. These conventional arts may be used or applied properly so as to provide a function of drift compensation with an internal combustion engine.

[Abnormality Detection of First Embodiment]
(Analysis Result of Preload Loss Abnormality)

The inventor earnestly studied to analyze preload loss and then following knowledge was obtained. That is, a piezoelectric type in-cylinder pressure sensor, in which a piezoelectric element is used as a pressure sensing element, or a strain gage type in-cylinder pressure sensor, in which a strain gage is used as a pressure sensing element, are typically used as an in-cylinder pressure sensor. Generally, in these types of in-cylinder pressure sensors, preload is provided to its pressure sensing element when the in-cylinder pressure sensor is attached to an internal combustion engine for the purpose of high accuracy measurement of in-cylinder pressure. As described above, preload is also given to the in-cylinder pressure sensor 5 according to the first embodiment.

Impulsive force or excessive pressure may occur in an operation of an internal combustion engine. That is, impulsive force may occur with rapid combustion in abnormal combustion, such as a knocking, or in-cylinder pressure may become very large as compared with that in usual operation. In the first embodiment, similarly, those impulsive force or excessive pressure may affect the in-cylinder pressure sensor 5 so as to cause a plastic deformation in the in-cylinder pressure sensor 5. Specifically, for example, when the excessive force is applied to a contact portion of the housing 22 and the transmission rod 26, and then an end portion of the transmission rod 26 is crushed so as to be flat. Besides, the welded portion of the housing 22 and the housing 24 carries out a plastic deformation. This plastic deformation may reduce the preload provided to the strain gage element 20. As a result of this, the output sensitivity improved by the preload will fall, and trouble may occur in in-cylinder-pressure measurement.

Figure 3:
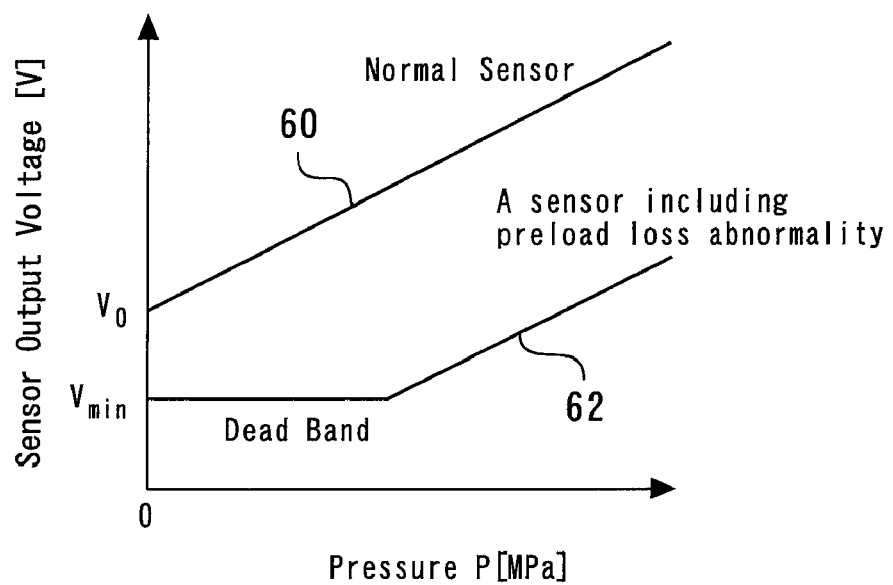
FIG. 3 schematically shows an output characteristic 60 of normal conditions and an output characteristic 62 including preload loss abnormality of the in-cylinder pressure sensor 5.
Figure 4:
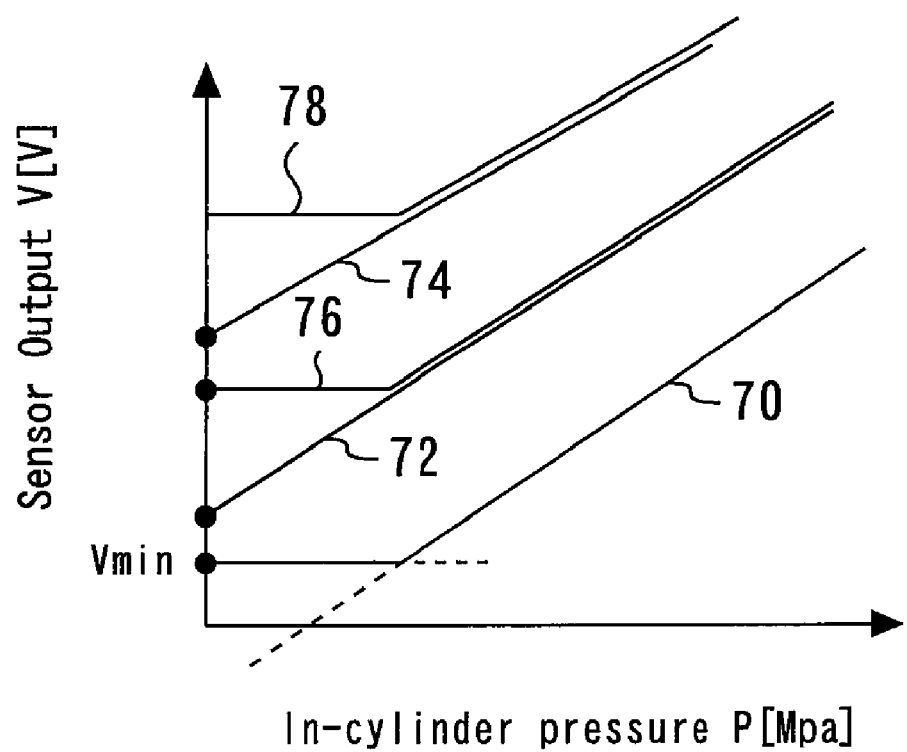

FIGS. 3 to 5 are figures for explaining the content of still more detailed analysis about preload loss which the inventor studied. Hereafter, the abnormalities of the in-cylinder pressure sensor caused by preload loss are explained in detail referring with FIGS. 3 to 5.

FIG. 3 schematically shows an output characteristic 60 of normal conditions and an output characteristic 62 including preload loss abnormality of the in-cylinder pressure sensor 5. The axis of ordinate of FIG. 3 illustrates an output voltage of the in-cylinder pressure sensor 5, and the lateral axis of FIG. 3 illustrates a pressure P (namely, pressure which is an in-cylinder pressure of the internal-combustion engine, and is applied to the diaphragm 28) which the in-cylinder pressure sensor 5 is measuring. The voltage V0 in FIG. 3 is a zero point output of the in-cylinder pressure sensor 5 in the normal conditions after zero point offset is performed. On the other hand, the voltage Vmin in FIG. 3 means an output voltage lower limit value determined by the hardware of the in-cylinder pressure sensor 5, that is, a lower limit of the output voltage which the internal circuit of the in-cylinder pressure sensor 5 can output. Hereafter, for convenience, a hardware minimum voltage value of the in-cylinder pressure sensor is also referred to as a "circuit limit value". Besides, a state where the lower limit of an in-cylinder pressure sensor output reaches the circuit limit value is also referred to as a "lower output saturation" and a part of the output, which the lower part output saturation has occurred, of the in-cylinder pressure sensor is also referred to as a "lower output saturation point."

As mentioned above, in general, zero point offset is performed to the in-cylinder pressure sensor 5 by preload. Therefore, in the normal state, the output voltage from the in-cylinder pressure sensor 5 rises from voltage V0 according to increase of pressure P. However, if preload loss occurs in the strain gauge element 20, the average value of the output voltage of the in-cylinder pressure sensor 5 will shift to the low-voltage side on the average. If such shift amount on the low-voltage side is large, the output voltage of the in-cylinder pressure sensor 5 will shift to the degree in which the output voltage of the in-cylinder pressure sensor 5 on the side of low-pressure range falls below the circuit limit value Vmin. As a result of this, dead band occurs in the output characteristic 62 as illustrated in FIG. 3, thereby pressure measurement becomes prevented on the low-pressure side.

FIG. 4 is a schematic diagram for explaining the difference between preload loss abnormality and the simple output offset resulting from a temperature drift or the like. In the temperature drift, the output level of an in-cylinder pressure sensor shifts greatly according to temperature (for example, refer to JP-A-7-301145). When the output of the in-cylinder pressure sensor 5 markedly shifts to lower voltage by the temperature drift, it is assumed that dead band occurs like the output characteristic 70 in FIG. 4. Here, if the output characteristic 70 occurred by the temperature drift, the output characteristic is recovered as the output characteristic 72 or 74 by performing the compensation of the temperature drift. That is, the dead band can be removed. However, if the output characteristic 70 occurred for the same reason as the output characteristic 60 in FIG. 3 (namely, preload loss abnormality), the output characteristic is not recovered even if temperature drift compensation is performed.

Figure 5A:
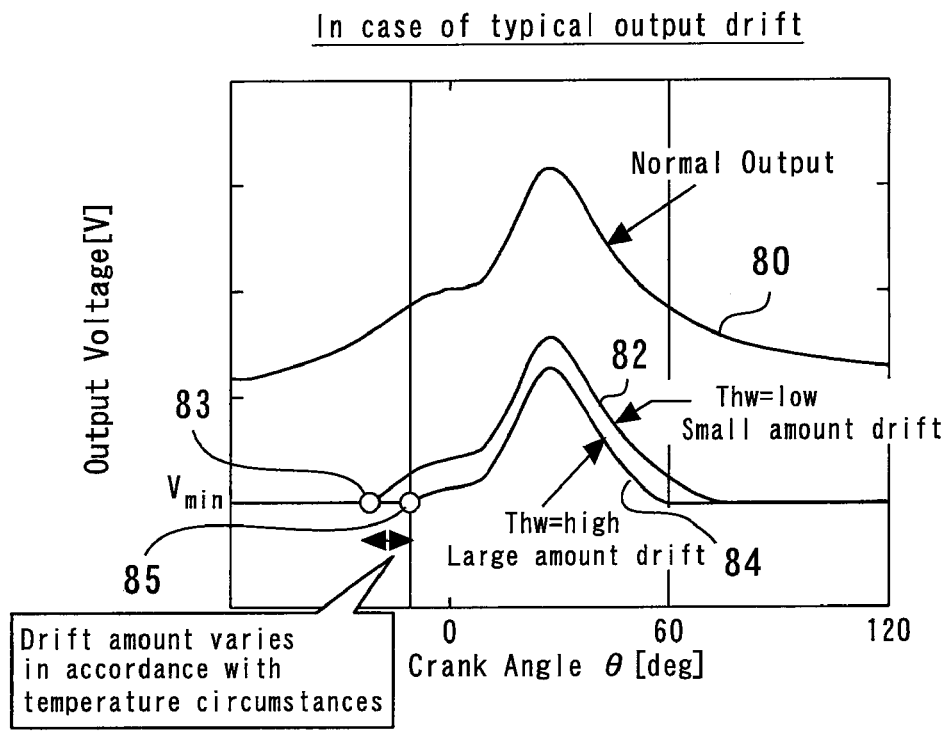
FIGS. 5A and 5B are diagrams for explaining the difference between preload loss abnormality and the temperature drift.

The difference between preload loss abnormality and the temperature drift will now be described in more detail by using FIG. 5. FIG. 5A schematically shows the state of the temperature drift. As an example, the output of the in-cylinder pressure sensor for each crank angle is illustrated schematically. The in-cylinder pressure sensor illustrated in description of FIG. 5 has a characteristic in which output voltage carries out a drift to the low-voltage side as its surrounding temperature becomes higher (that is, water temperature of internal combustion engine (hereinafter, referred to as "Thw") becomes higher). The output characteristic 82 illustrates a state where internal-combustion-engine water temperature (hereinafter, referred to as "Thw") is relatively low, and the output characteristic 84 illustrates a state where the internal-combustion-engine water temperature Thw is relatively high. Hereinafter, consideration is given to the case where the output of an in-cylinder pressure sensor changes from the normal output characteristic 80 to the output characteristic 82 or 84 by the temperature drift. It should be noted that there may be an in-cylinder pressure sensor in which an output drift by a temperature change occurs in opposite direction from the described case. However, both are the same with respect to a point that a temperature change causes an output drift in the specific direction. Therefore, in order to avoid duplication, description is made only about the case where output voltage carries out a drift to the low-voltage side as surrounding temperature becomes higher.

Figure 5B:
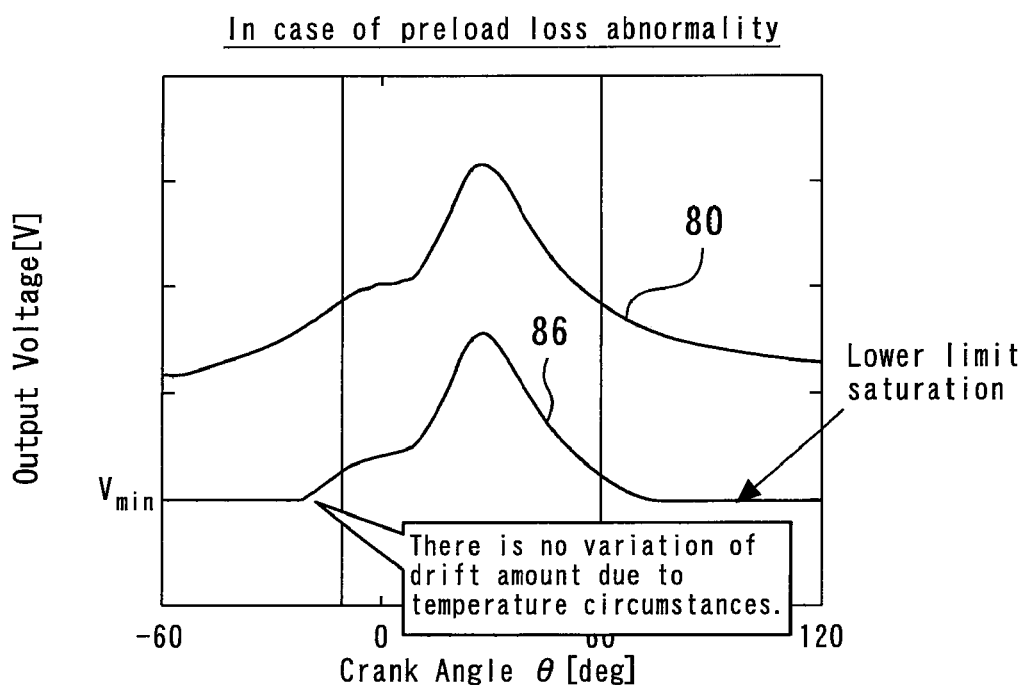

In the case of a temperature drift, the degree of the drift changes according to the surrounding temperature of an in-cylinder pressure sensor. Therefore, as illustrated in FIG. 5A, a terminal point of dead band turns into a point 83 when the internal combustion engine water temperature Thw is low, and the terminal point of dead band turns into a point 85 when the internal combustion engine water temperature Thw is high. That is, the degree of the lower output saturation changes in accordance with variation of surrounding temperature. On the other hand, FIG. 5B schematically shows the state of preload loss abnormality. In case of an output characteristic 86 caused by preload loss abnormality, unlike the case of temperature drift illustrated in FIG. 5A, the degree of lower output saturation is not affected by surrounding temperature. Thus, preload loss abnormality and the temperature drift are clearly different.

(Basic Operation of the Preload-Loss Abnormality Detection According to First Embodiment)

The inventor found out an effective technique of detecting preload loss abnormality on a basis of the above knowledge. Hereafter, basic operation of abnormality detection according to the first embodiment will now be described.

As described above, when preload loss abnormality occurs in the in-cylinder pressure sensor 5, dead band occurs in the output of the in-cylinder pressure sensor 5. As described above, appearance of this dead band indicates a similar condition to temperature offset. However, if it is the temperature drift, the drift reset part 30a can compensate the drift. On the other hand, preload loss abnormality is not recoverable by the drift compensation of the drift reset part 30a because preload loss is an abnormality of hardware of the in-cylinder pressure sensor 5.

Therefore, the first embodiment performs a judgment whether or not there is a sign indicating an occurrence of preload loss abnormality (hereafter, this judgment is also referred to as a "sign judgment"). That is, in the first embodiment, detection is performed to detect existence or nonexistence of the dead band which can be regarded as a sign of a preload loss in the output characteristic of the in-cylinder pressure sensor 5.

When the above mentioned dead band is detected, the drift reset unit 30a performs the drift compensation on the supposition that a temperature drift has occurred. Here, the drift compensation is performed as if the dead band is caused by the temperature drift and the temperature drift can be sufficiently canceled.

Then, one more time, it is investigated whether the dead band exists in the output characteristic of the in-cylinder pressure sensor 5. If the dead band still remains after the drift compensation, it can be judged that this dead band is caused not by output offset but by preload loss abnormality.

[Sign Judgment of Preload Loss Abnormality According to the First Embodiment]

Hereinafter, techniques of the sign judgment according to the first embodiment will now be described in detail. The first embodiment uses a combination of two techniques for the sign judgment. A first sign judgment technique is a technique which takes into consideration the relationship between intake pressure and exhaust pressure of an internal-combustion engine. A second sign judgment technique is a technique which takes into consideration the output value which the in-cylinder pressure sensor 5 should output in an intake stroke.

(1) First Sign-Judgment-Technique According to the First Embodiment

Figure 6A:
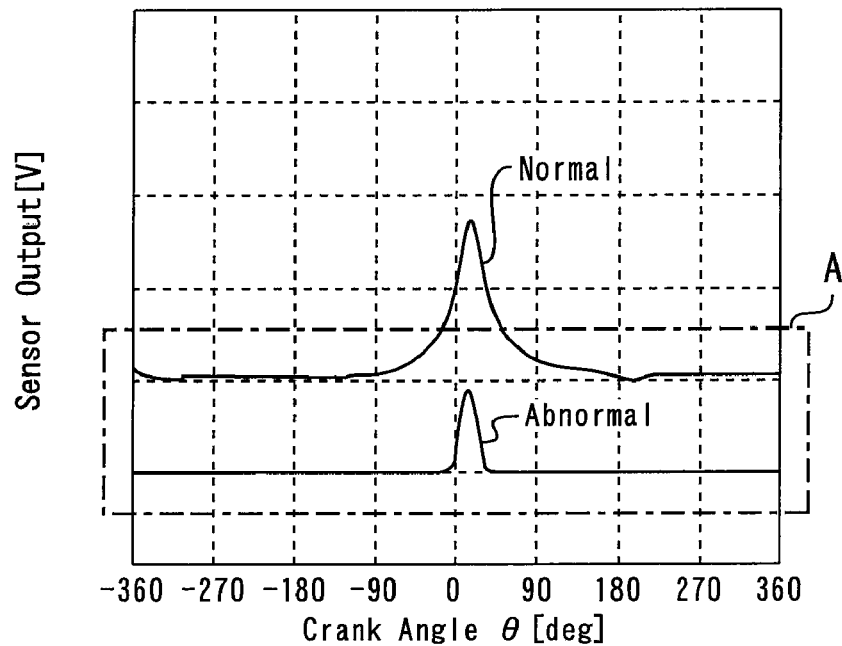
FIGS. 6A and 6B are diagrams for explaining a first sign judgment according to the first embodiment.
Figure 6B:
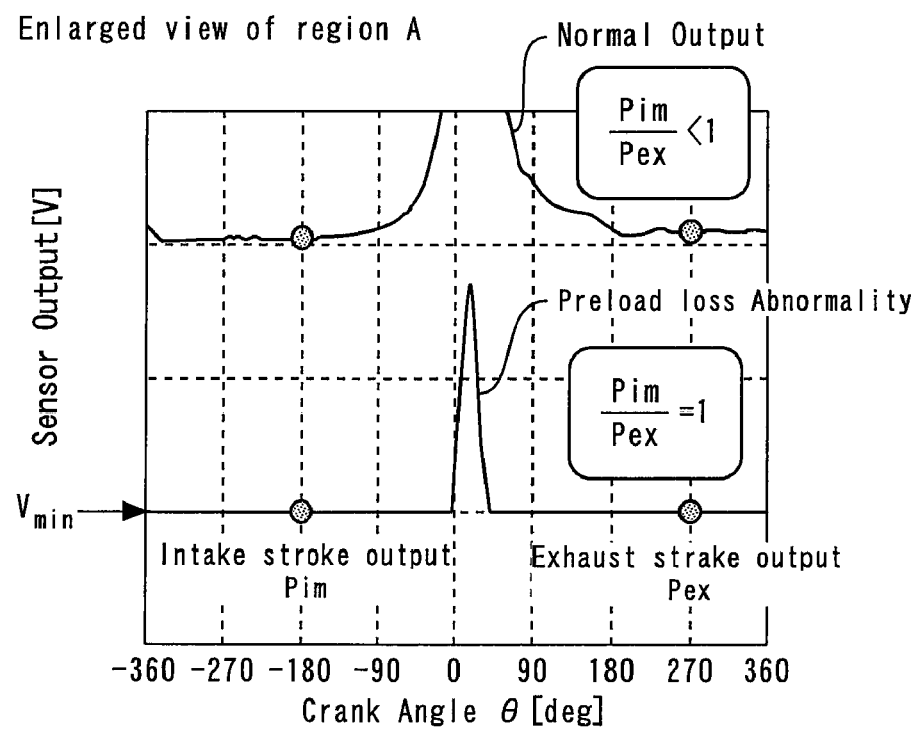

FIG. 6 is a diagram for explaining the first sign judgment according to the first embodiment. FIG. 6A illustrates the output of the in-cylinder pressure sensor 5 according to crank angle. As described before, if preload loss abnormality occurs, the output level of the in-cylinder pressure sensor 5 will shift to low-voltage side on the average due to the degradation of output sensitivity. Following this, as illustrated in FIG. 6A, the output characteristic of the in-cylinder pressure sensor 5 changes from the normal characteristic illustrated in the upside of the figure to the characteristic illustrated in the bottom side of the figure. FIG. 6B is a partially enlarged view of the area of the dashed line A in FIG. 6A.

Generally, it is satisfied that exhaust pressure is sufficiently larger than intake pressure in a natural aspiration type internal combustion engine in which intake air amount control is performed with a throttle valve or the like. The first sign judgment technique pays attention to the difference of the intake pressure and the exhaust pressure. Specifically, an intake stroke pressure Pim indicates a value of the in-cylinder pressure obtained based on the output voltage of the in-cylinder pressure sensor 5 at the time of crank angle=minus 180 degree in the intake stroke. Also, an exhaust stroke pressure Pex indicates a value of the in-cylinder pressure obtained based on the output voltage of the in-cylinder pressure sensor 5 at the time of crank angle being 270 degrees in the exhaust stroke. Then, those ratio Pim/Pex is used for the sign judgment.

As described above, a relationship of Pim<<Pex should be filled in case of an internal combustion engine whose exhaust pressure is sufficiently larger than its intake pressure. Therefore, if the in-cylinder pressure sensor 5 is normal, the ratio Pim/Pex becomes sufficiently smaller than 1. On the other hand, due to the influence of the dead band, output voltage shows the circuit limit value Vmin in both the intake stroke and the exhaust stroke in the output characteristic when preload loss abnormality occurs (see the output characteristic of the bottom side in FIG. 6A and 6B). Thus, in this case, the ratio Pim/Pex becomes equal to 1. Therefore, by a judgment whether the ratio Pim/Pex is 1 or not, it is possible to judge whether or not there is a sign of appearance of preload loss abnormality.

(2) Second Sign-Judgment-Technique According to the First Embodiment

Figure 7:
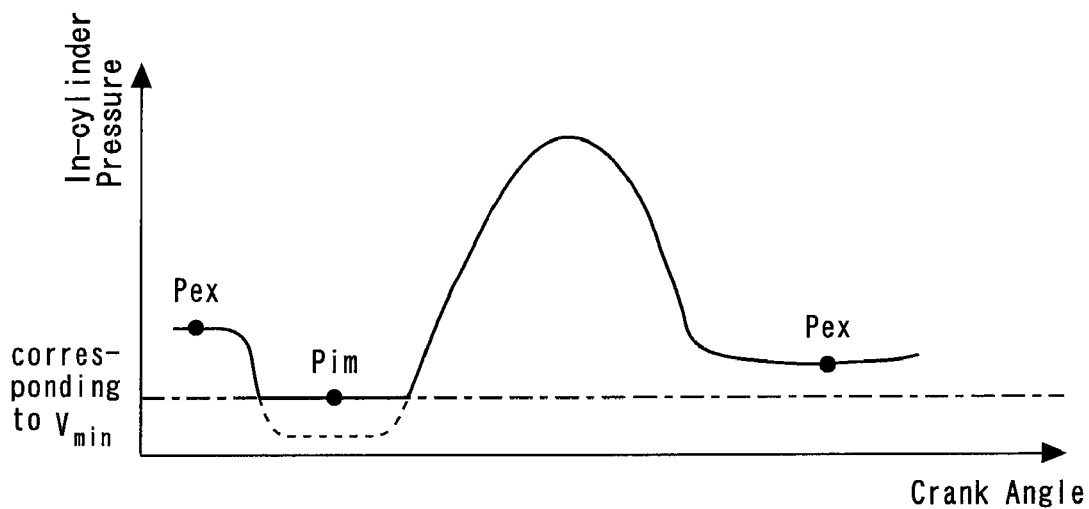
FIG. 7 is a diagram for explaining a second sign judgment according to the first embodiment.

Next, the second sign judgment technique will now be described by using FIG. 7. In an internal combustion engine that its exhaust pressure is sufficiently larger than its intake pressure, when preload loss occurs, the output level of the in-cylinder pressure sensor 5 may changes as illustrated in FIG. 7. That is, the sensitivity of the in-cylinder pressure sensor 5 may remain to such an extent that exhaust pressure can be measured although intake pressure cannot be measured normally. As a result, the ratio Pim/Pex shows values other than one although preload loss has occurred to the degree by which measurement of intake pressure is prevented. Therefore, if the sign judgment fully depends on the criterion of the first sign judgment technique, the preload loss abnormality as illustrated in FIG. 7 may be missed.

For this reason, in the first embodiment, the second sign judgment is performed as described below. First, the output voltage value of the in-cylinder pressure sensor 5 showing the intake stroke pressure Pim is obtained. Hereinafter, this voltage value is referred to as V (Pim). Next, if the ratio Pim/Pex shows other than 1 in the above-mentioned first sign judgment, then it is judged whether or not the voltage value V (Pim) is larger than the circuit limit value Vim. If the voltage value V (Pim) does not exceed the circuit limit value Vim, in other words, if the voltage value V (Pim) is so low as to equal to the circuit limit value Vim, there is a possibility that preload loss abnormality may occur as illustrated in FIG. 7. Therefore, the present embodiment also regards this case as the sign of preload loss. This makes it possible to treat the case, in which the dead band due to preload loss abnormality occurs only in the intake pressure side, as the target of the sign judgment.

[Details of Process Performed by First Embodiment]

Figure 8:
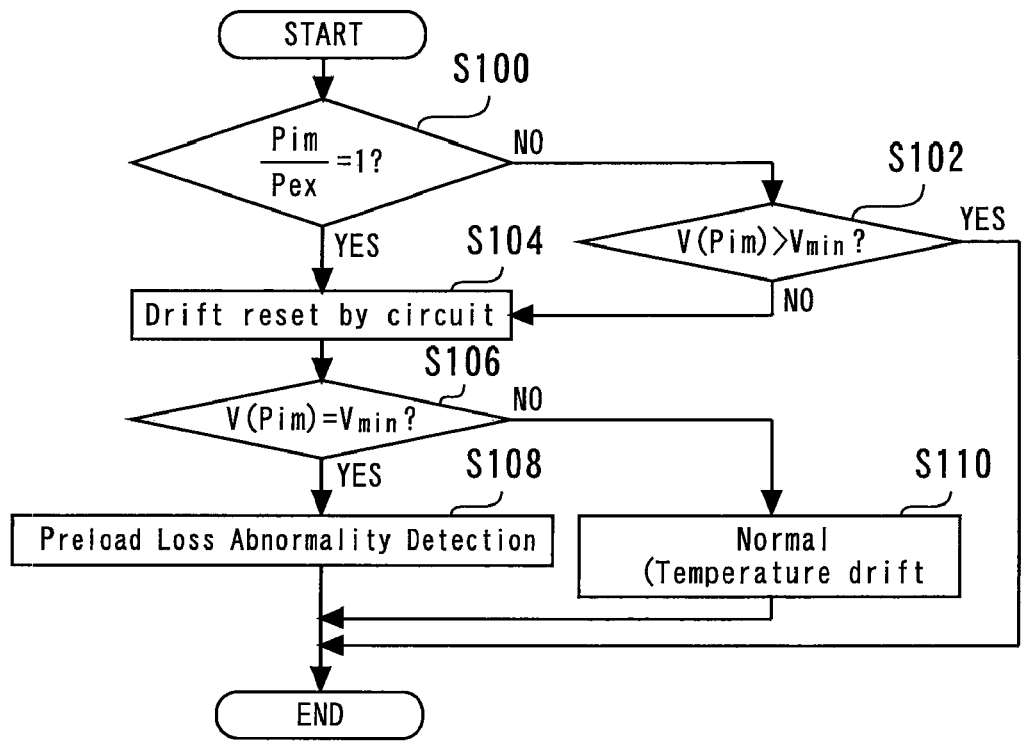
FIG. 8 is a flowchart illustrating a routine that is executed by the ECU 50 in the first embodiment.

A process according to the first embodiment will now be described in detail. FIG. 8 is a flowchart illustrating a routine that is executed by the ECU 50 in the first embodiment. In the flowchart of FIG. 8, step S100 achieves the above described first sign judgment, and step S102 achieves the above described first sign judgment.

First, the routine illustrated in FIG. 8 performs a judgment step about whether or not Pim/Pex is 1 (step S100). At this step, first, the ECU 50 computes the intake stroke pressure Pim on the basis of output which the in-cylinder pressure sensor 5 shows when the crank angle sensor 8 indicates crank angle=minus 180 degree. Sequently, the ECU 50 computes the exhaust stroke pressure Pex on the basis of output which the in-cylinder pressure sensor 5 shows when the crank angle sensor 8 indicates crank angle=270 degree. It should be noted that an exhaust stroke pressure in the last combustion cycle and an intake stroke pressure in present combustion cycle may be also used. Then, Pim/Pex, which is a ratio of the Pim and the Pex obtained here, is compared with 1. Thereby, judgment processing whether or not these are the same is performed. At this step S100, the above described first sign-judgment-technique is achieved.

If the query in step S100 is answered "No", it is judged whether the relationship of V (Pim)>Vmin is filled or not (step S102). At this step, the circuit limit value Vmin is compared with the output voltage V (Pim) of the in-cylinder pressure sensor 5 which is used as the basis of Pim in step S100. The circuit limit value Vmin is a value determined in accordance with the specification of the in-cylinder pressure sensor 5, and the ECU 50 memorize the Vmin beforehand. If the query in step S102 is answered "No", it is possible to consider, at this stage, that the in-cylinder pressure sensor 5 corresponds to neither the first sign judgment criterion nor the second sign judgment criterion. Therefore, the routine comes to an end.

If the condition of at least one of step S100 or S102 is established, the drift reset is performed (step S104). At this step, the drift reset unit 30a compensates the temperature drift of the in-cylinder pressure sensor 5 so as to cancel it. If the sign detected in the in-cylinder pressure sensor 5 at step S100 or S102 is caused by the temperature drift, the sign will disappear by processing at this step S104.

After step S104, then, a judgment whether or not V (Pim) equals to Vmin is performed (step S106). At this step, comparison of V (Pim) and Vmin is performed like step S102 described above. If the query in step S106 is answered "No", in other words, if V (Pim) and Vmin are not same, it is possible to consider that preload loss abnormality found at step S100 or S102 is caused by the temperature drift. Furthermore, it is possible to consider that temperature drift compensation at step S104 could solve the abnormality in the in-cylinder pressure sensor 5. Therefore, the routine comes to step S110 and performs a judgment that there is no abnormality and a judgment that the sign is from the temperature drift, then the routine comes to the end.

On the other hand, if the condition of step S106 is established, the routine comes to step S108. At step S108, the routine concludes that preload loss abnormality has occurred. The reason why is that, in spite of the drift reset of step S104, V (Pim) is equal to Vmin. Consequently, occurrence of preload loss abnormality in the in-cylinder pressure sensor 5 is determined by means for, for example, setting an abnormality flag to be ON. Then, the routine comes to the end.

The above process makes it possible to detect preload loss abnormality in the in-cylinder pressure sensor 5. The first embodiment also makes it possible to accurately detect the sign of preload loss abnormality by using both of the first and second sign judgment techniques.

In the first embodiment, which has been described above, obtainment of output from the in-cylinder pressure sensor 5 by the ECU 50 corresponds to the "obtaining means" according to the first aspect of the present invention; step S100 and S102 in the routine of FIG. 8 corresponds to the "output abnormality detecting means" according to the first aspect of the present invention; step S104 in the routine of FIG. 8 corresponds to the "drift reset means" according to the first aspect of the present invention; step S106 in the routine of FIG. 8 corresponds to the "preload loss abnormality detecting means" according to the first aspect of the present invention. Also, in the first embodiment, the in-cylinder pressure sensor 5 corresponds to the "in-cylinder pressure sensor"; the strain gage element 20 corresponds to the "pressure sensing element".

Also, in the above described first embodiment, step S104 in the routine of FIG. 8 corresponds to the "abnormal circumstance drift reset means" according to the second aspect of the present invention.

[Modifications of First Embodiment]

(First Modification)

In the first embodiment, the existence of the abnormality of preload loss was detected for the in-cylinder pressure sensor 5 which has the strain gauge element 20. However, configuration of an in-cylinder pressure sensor to which the abnormality detection of the present invention may be applied is not limited to this in-cylinder pressure sensor 5. In case of preload-provided-type in-cylinder pressure sensor, regardless of strain gauge type or piezo-electric type, the problem of preload loss may occur. Therefore, if an in-cylinder pressure sensor is preload-provided-type, the present invention may be applied. Thus, the present invention does not restrict the detailed configuration of strain gauge element or piezoelectric element.

Besides, there are various types of configurations and attachment manners of in-cylinder pressure sensor. For example, various types of in-cylinder pressure sensors such as an ignition plug unification system, a fuel injector unification system, and a system in which a part of configuration of in-cylinder pressure sensor is exposed in cylinder as described in JP-A-2005-291091, are known. The problem of preload loss abnormality may occur in these several types of in-cylinder pressure sensors as far as they are preload-provided-type in-cylinder pressure sensor. Therefore, as far as preload is provided, the present invention can be widely applied to various in-cylinder pressure sensors including these exemplary described manners and configurations.

Besides, regardless of strain gauge type or piezo-electric type, some articles are already known with respect to appearance of the output drift of an in-cylinder pressure sensor. For example, with respect to temperature drift, JP-A-7-301145 is disclosed. Besides, with respect to techniques for compensation of output drift, many techniques are already known as described in, for example, JP-A-2007-327502. Therefore, the various techniques for compensation of output drift (cancellation of the drift influence) of an in-cylinder pressure sensor may be suitably used instead of the technique exemplarily described in the first embodiment. Moreover, it is also possible to use either a type of output compensation function which resets the influence of drift at once or a type of output compensation function which reduce the amount of drift.

In addition, although not illustrated in FIGS. 3 to 5, if an open-circuit accident or a short circuit occurs in the in-cylinder pressure sensor 5, its output characteristic will become basically flat over the whole region of crank angle. By contrast, in case of preload loss, there remain a region having sensitivity as illustrated in FIGS. 3 to 5 (specifically, a region corresponding to a high in-cylinder pressure region during compression stroke and expansion stroke). That is, preload loss abnormality may cause a misunderstanding that the in-cylinder pressure sensor 5 emits output signal corresponding to the in-cylinder pressure. At this point, preload loss abnormality is different from failure modes of an open-circuit failure and a short circuit.

It should be noted that the first embodiment performs the preload loss abnormality detection in the internal-combustion engine which performs the intake air amount control with the throttle valve 2. However, the present invention is not limited to this. For example, there is also a type of internal-combustion engine which performs intake air amount control by controlling precisely the opening characteristics of an intake valve instead of a throttle valve. Also in such a type, as far as under operational condition that the difference of intake pressure and exhaust pressure is large, preload loss abnormality can be judged by using output value from an in-cylinder pressure sensor as well as the first embodiment.

Second Embodiment

Second embodiment according to the present invention will now be described hereinafter. The second embodiment includes the same hardware configuration as the first embodiment. In the following, difference with the first embodiment is mainly explained and description is omitted about the same matter.

Figure 9:
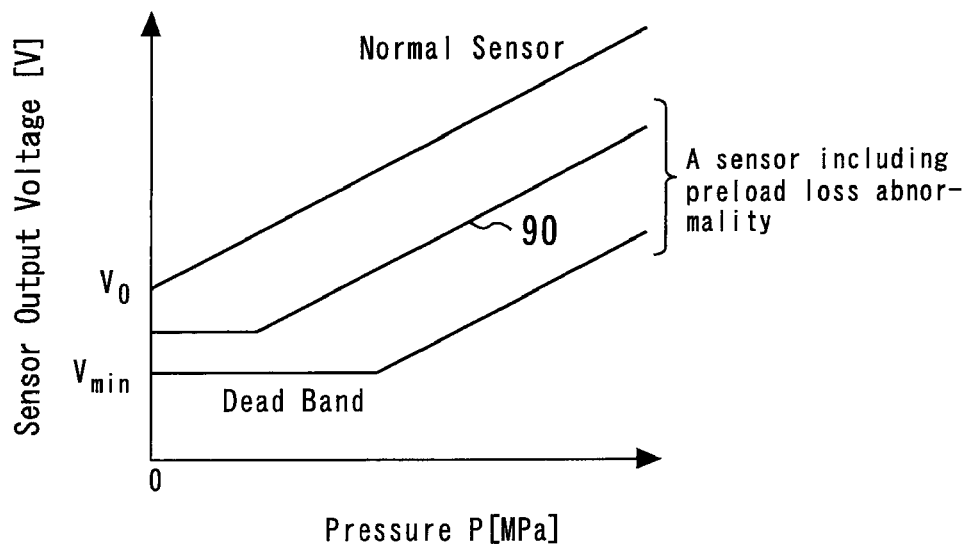
FIG. 9 is a diagram for explaining a preload loss abnormality detection technique according to the second embodiment.

FIG. 9 is a diagram for explaining preload loss abnormality detection technique according to the second embodiment. An output characteristic 90 in FIG. 9 is influenced by preload loss abnormality. If preload loss abnormality occurs, the lower output saturated point of the in-cylinder pressure sensor 5 does not necessarily become the circuit limit value Vmin. The lower output saturation point may appear at a position between the voltage V0 by zero point offset and the circuit limit value Vmin Like the output characteristic 90 of FIG. 9. In case where such a variation of lower output saturation point is taken in consideration, the judgment performed at step S106 of FIG. 8 in the first embodiment may not work effectively.

Figure 10:
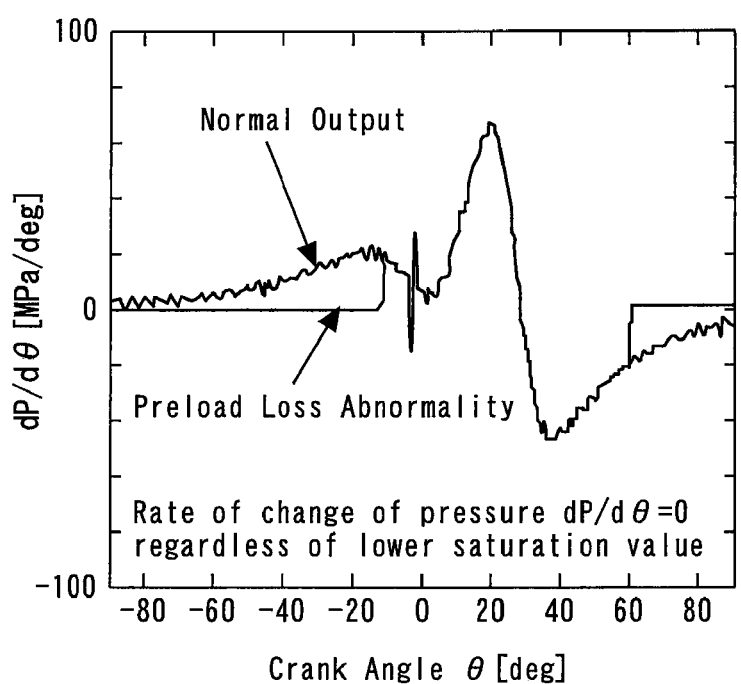
FIG. 10 illustrates the rate of change of the value of an in-cylinder pressure based on the output of the in-cylinder pressure sensor 5 according to crank angle.

The inventor observed the behavior of the output of the in-cylinder pressure sensor 5 in an intake stroke. FIG. 10 illustrates the rate of change of the value of an in-cylinder pressure based on the output of the in-cylinder pressure sensor 5 according to crank angle. That is, $dP/d\theta$, in case where an in-cylinder pressure is P and crank angle is $\theta$, is illustrated. As illustrated in FIG. 9, the output characteristic of preload loss abnormality holds $dP/d\theta=0$ during an intake stroke. This is clearly different from normal output characteristics. The variation of lower output saturation point described in FIG. 9 has no relationship to the behavior whether or not $dP/d\theta$ becomes zero. That is, the conditions of $dP/d\theta=0$ is a criterion being applicable in common to several in-cylinder pressure sensors in which each lower output saturation point differs. Hence, the second embodiment performs a judgment using the $dP/d\theta$ instead of the judgment at step S106 of FIG. 8 in the first embodiment.

Figure 11:
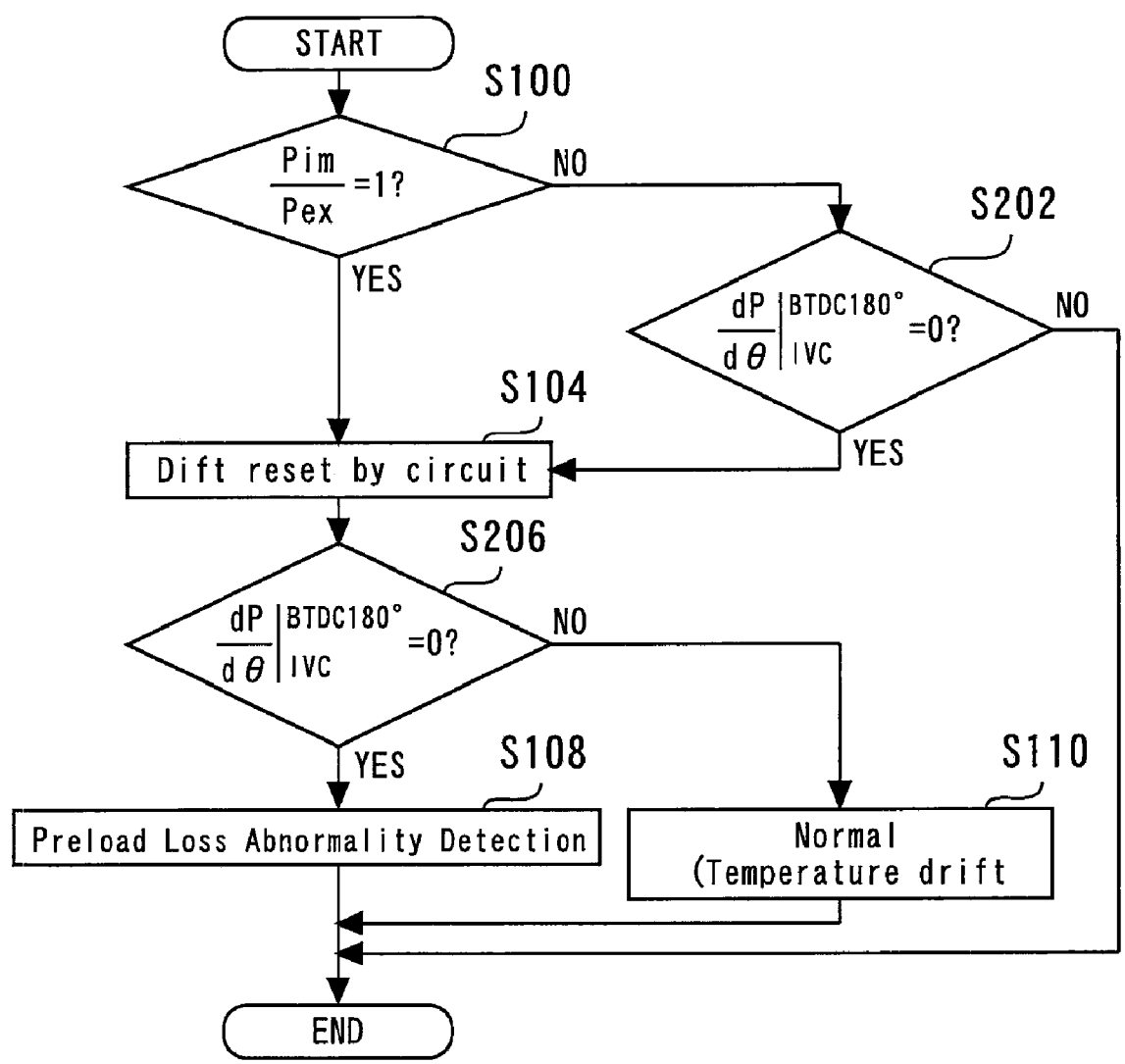
FIG. 11 is a flowchart illustrating a routine that is executed by the ECU 50 in a second embodiment.

FIG. 11 is a flowchart illustrating a routine that is executed by the ECU 50 in the second embodiment. Except for step S206 and step S202, the flow chart of FIG. 11 is the same as the flow chart of FIG. 8 according to the first embodiment. In the following, explanation is given mainly about the difference.

First, the routine of FIG. 11 performs step S100 as well as the first embodiment. If the query in step S100 is answered "No", the routine comes to step S202. At step S202, performed is a judgment about whether $d\theta$ from BTDC 180 degree to IVC equals to zero or not. Detailed description is not given about the method of calculation of the detailed value of $dP/d\theta$ here since known computation techniques can be properly used. Here, BTDC 180 degree corresponds to an intake bottom dead center and. IVC corresponds to a crank angle at which an intake valve closes. If the relationship in this step is not satisfied, the output of the in-cylinder pressure sensor 5 has changed in a period from BTDC 180 degree to IVC. Then, it is possible to consider that the in-cylinder pressure sensor 5 does not have abnormality of the dead band in a period from BTDC 180 degree to IVC. Therefore, the routine comes to the end.

If the condition of step S202 is established, the routine comes to step S104. At step S104, drift reset is performed as described in the first embodiment. Then, in the second embodiment, processing comes to step S206. At step S206, the same processing as step 202 is performed again. That is, performed is the judgment about whether $dP/d\theta$ from BTDC 180 degree to IVC equals to zero or not. If the relationship $dP/d\theta=0$ is satisfied again at step S206, the routine comes to step S108 and existence of preload loss abnormality is determined as in the first embodiment. Besides, if the query in step S206 is answered "No", the routine comes to step S110 and nonexistence of preload loss abnormality is determined as in the first embodiment. Then, the routine comes to the end.

The above processings make it possible to detect preload loss abnormality of an in-cylinder pressure sensor on the basis of output change of the in-cylinder pressure sensor in an intake stroke. By using $dP/d\theta$ as a base of detection, dead band of each in-cylinder pressure sensor is detectable in common under a plurality of situations where the magnitude of the output value of each in-cylinder pressure sensor in the dead band region differs. As described above, according to the second embodiment, the sign judgment of preload loss abnormality and the preload loss abnormality detection can be effectively performed by using the output rate of change of the in-cylinder pressure sensor 5. It should be noted that the present invention is not limited only to judgment whether or not $dP/d\theta$ is completely equal to zero. For example, processing as in the second embodiment may be performed by judging whether or not $dP/d\theta$ equals to a minute value which can be considered substantially as zero (or by judging whether or not a value of $dP/d\theta$ is within a minute range).

Third Embodiment

Third embodiment includes the same hardware configuration as the second embodiment. In the following, difference with the second embodiment is mainly explained and description is omitted about common matter of them.

In both of the first and second embodiments, sign judgment of preload loss abnormality of the in-cylinder pressure sensor 5 is performed based on the ratio of Pim to Pex. This uses a relationship which exhaust pressure is sufficiently higher than intake pressure. However, there is a case where this relationship may not be satisfied. For example, in an internal combustion engine having a supercharger, intake pressure may become so high that Pim≧Pex is established. In this case, it may be impossible to perform the sign judgment based on the ratio of Pim to Pex with sufficiently high accuracy.

Figure 12:
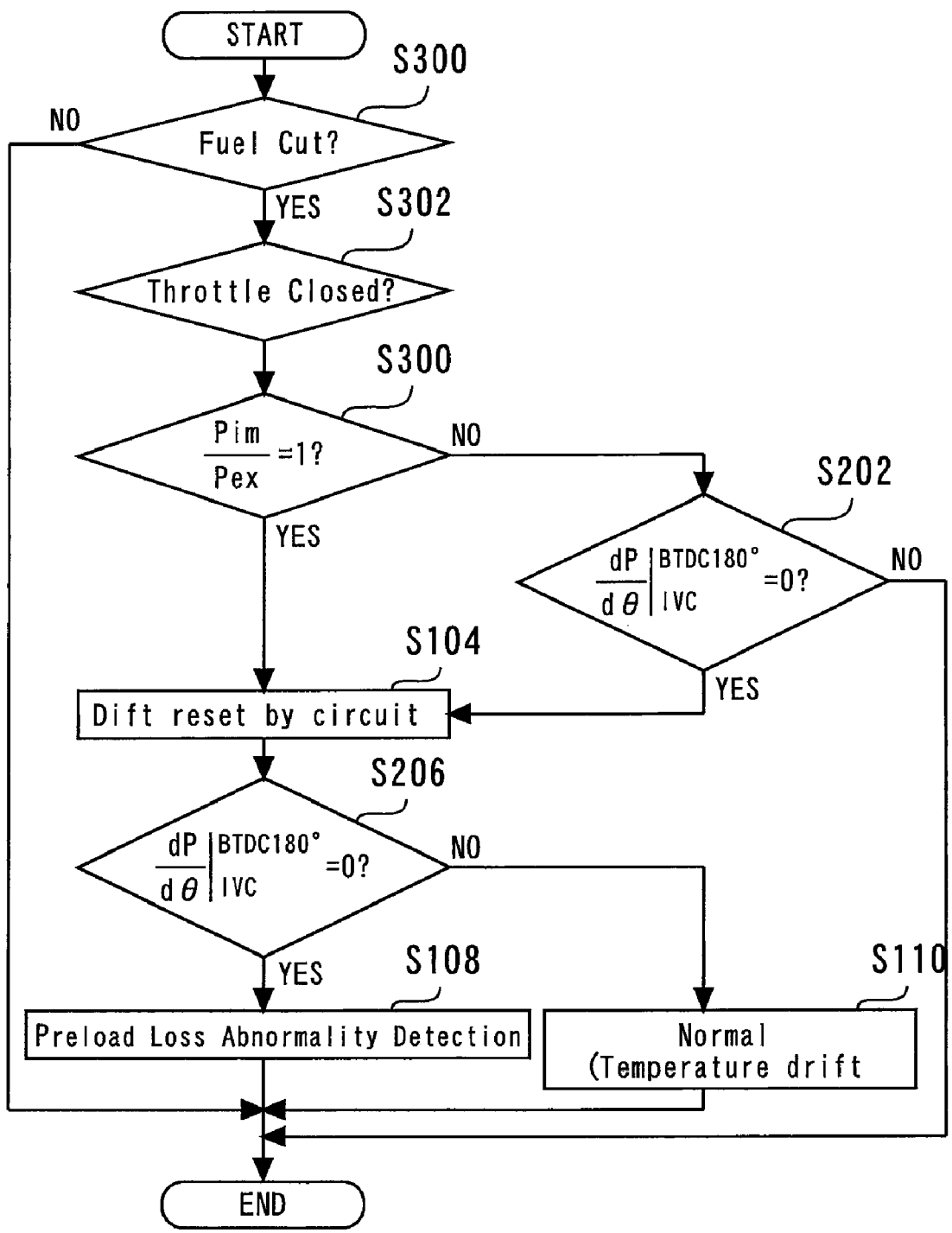
FIG. 12 is a flowchart illustrating a routine that is executed by the ECU 50 in a third embodiment.

For this reason, in the third embodiment, following technique is adopted in view of the above point. FIG. 12 is a flowchart illustrating a routine that is executed by the ECU 50 in the third embodiment. Except steps S300 and S302 are added, it is the same as the flow chart of FIG. 11 according to the second embodiment.

That is, first of all, the third embodiment detects whether the internal combustion engine is performing fuel-cut (step S300). If fuel-cut is being performed, the routine comes to S302 and the throttle valve 2 is controlled so as to be closed completely (closing condition). Under this condition, the sign judgment based on the ratio of Pim to Pex (step S100) is performed.

Thereby, the sign judgment based on the ratio of Pim to Pex can be performed under throttle closing condition which makes the difference of intake pressure and exhaust pressure to be markedly enlarged. As a result, sign judgment can be achieved with high accuracy.

It should be noted that, in the third embodiment, execution of step S100 after closing of the throttle by step S300 and S302 of the routine of FIG. 12 corresponds to the "condition judgment means" in the sixth aspect of the present invention. Besides, in the third embodiment, the processing of step S300 in the routine of FIG. 12 corresponds to the "fuel-cut detecting means" in the seventh aspect of the present invention, and processing of step S302 corresponds to the "closing means" in the seventh aspect of the present invention.

It should be noted that, in the third embodiment, the throttle valve 2 is closed during the fuel-cut. However, the present invention is not limited to this. For example, an internal-combustion engine with the variable valve timing system which can halt its intake valve is known. Such internal combustion engine can close its intake passage and enlarge the difference of Pim and Pex by halting the intake valve properly so as to establish closing condition. By holding an intake valve at closing condition, the same effect as the third embodiment can be obtained also in the internal combustion engines which, for example, do not have a throttle valve (diesel engines, or gasoline engines which controls an intake air amount by opening characteristics of an intake valve, etc.)

Fourth Embodiment

A fourth embodiment is designed so as to control operating situation of the various application programs each using the output of the in-cylinder pressure sensor 5 according to the grade of preload loss abnormality. As described in the first embodiment, preload loss in the strain gauge element 20 is caused by a plastic deformation arising from various kinds of power due to knocking or the like. A main factor of preload loss, for example a magnitude of the power applied to the in-cylinder pressure sensor 5 or a degree of a distortion of the in-cylinder pressure sensor 5, may differ according to each situation. Therefore, the condition of preload loss in the strain gauge element 20 does not necessarily become uniform. According to this, there may be a plurality of cases with respect to the grade of preload loss abnormality. For example, there may be a serious case where measurement by an in-cylinder pressure becomes impossible in whole crank-angle area, or there also may be a slight case where dead band occurs only in the first stage of intake stroke. Therefore, the fourth embodiment controls the operating situation of the various application programs each using the output of the in-cylinder pressure sensor 5 in accordance with the grade of preload loss abnormality.

[Configuration and Operation of Fourth Embodiment]

The fourth embodiment has the same hardware configuration as the first embodiment. Furthermore, the fourth embodiment can perform processing of a preload loss abnormality judgment as in the first embodiment (or the second or third embodiment). In the following, differences with the first to third embodiments are mainly explained and description is omitted about common matter of them.

In the fourth embodiment, the following application programs are installed in ECU 50.

(a) A program which detects an intake air amount in each cylinder on the basis of a measured value of in-cylinder pressure obtained by the in-cylinder pressure sensor 5 (hereinafter, referred to as an "air amount detection program")

(b) A combustion rate (MFB) calculation program which uses a measured value of in-cylinder pressure obtained by the in-cylinder pressure sensor 5, and a control program using PVk (c) A knocking detection program which uses a measured value of in-cylinder-pressure obtained by the in-cylinder pressure sensor 5

It should be noted that techniques of intake-air-amount detection of each cylinder, combustion rate (MFB) calculation, control using PVk, and knocking detection, which are performed on the basis of in-cylinder pressure, are already known arts. Therefore, detailed description is not given here.

In the fourth embodiment, a part of output of the in-cylinder pressure sensor 5 is used as a base of calculation of the various above-mentioned programs. That is, each program uses the output which is obtained by the in-cylinder pressure sensor 5 while crank angle is in a determined range as the basis of the calculation. It should be noted that the output ranges where the each program refers to, in other words, crank angles at which the output starts to be referred and crank angles at which the output ends to be referred in the each program, are not necessarily the same.

Figure 13:
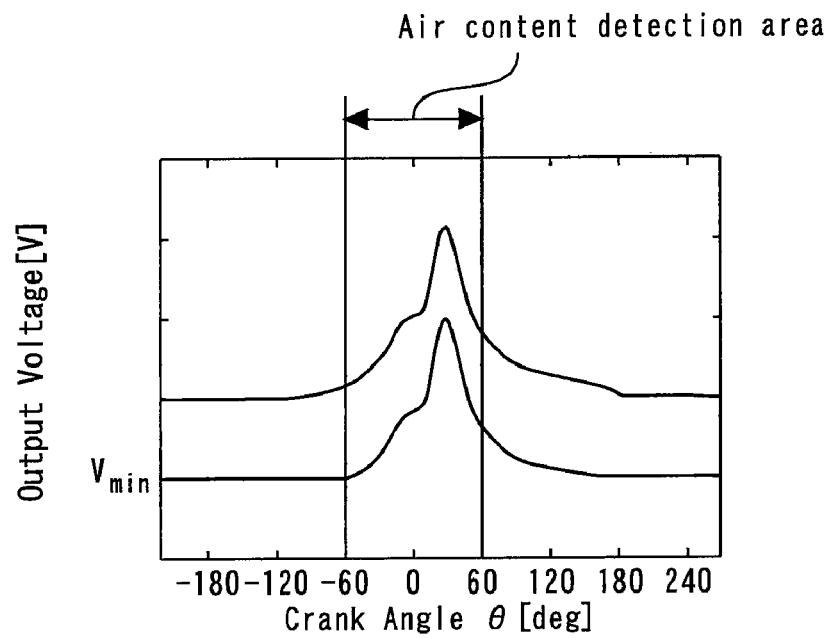
FIG. 13 is a diagram illustrating an area where the output of the in-cylinder pressure sensor 5 is used in the air content detection program of a fourth embodiment.

FIG. 13 is a diagram illustrating an area where the output of the in-cylinder pressure sensor 5 is used in the air content detection program of the fourth embodiment (hereinafter, referred to as an "air content detection area"). As illustrated in the figure, in the fourth embodiment, the air amount detection program uses the output of the in-cylinder pressure sensor 5 obtained in the range of minus 60 degree to plus 60 degree.

Figure 14:
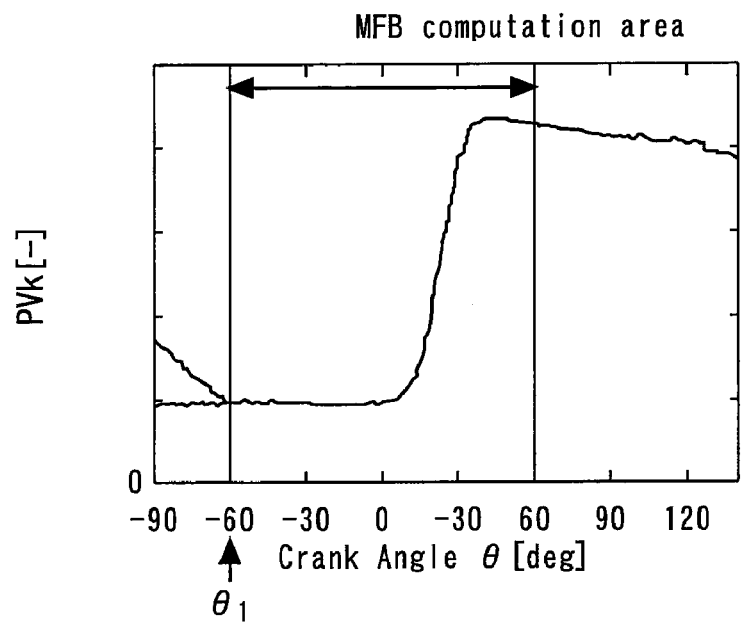
FIG. 14 is a diagram illustrating an area where the output of the in-cylinder pressure sensor 5 is used in the MFB calculation program of the fourth embodiment.

FIG. 14 is a diagram illustrating an area where the output of the in-cylinder pressure sensor 5 is used in the MFB calculation program of the fourth embodiment (hereinafter, referred to as a "MFB calculation area"). As illustrated in the figure, in the fourth embodiment, the MFB calculation program uses the output of the in-cylinder pressure sensor 5 in the range of minuses 60 degree to plus 60 degree. Hereinafter, for convenience, the crank angle corresponding to the starting point of the MFB calculation area is referred to as $\theta 1$.

Figure 15:
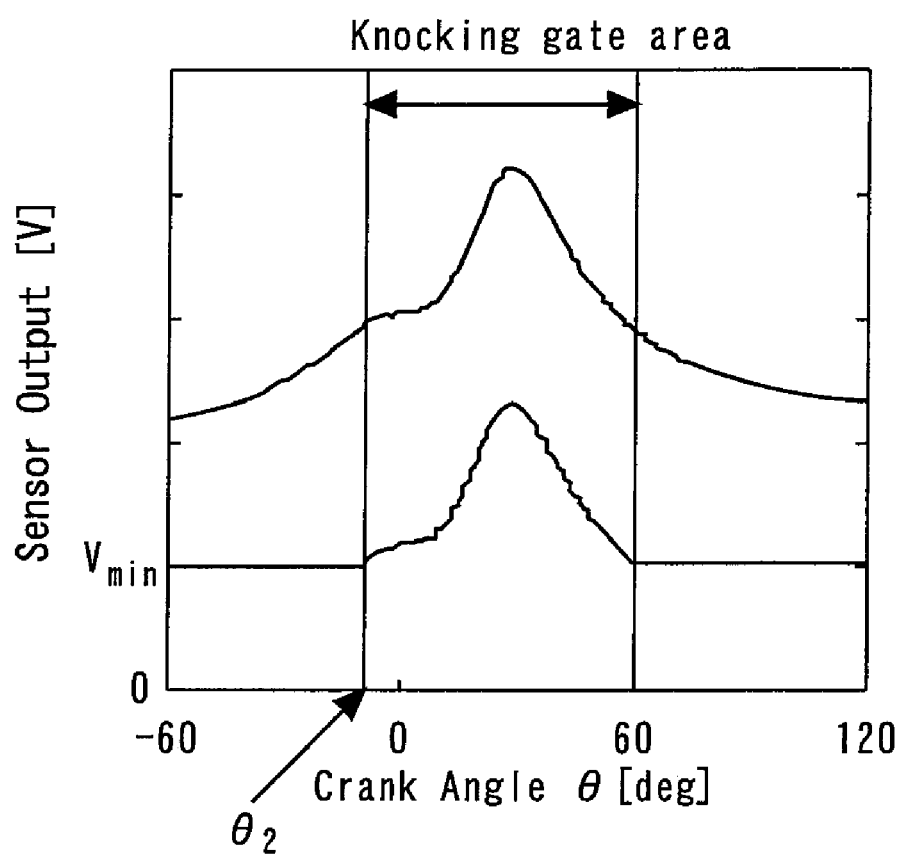
FIG. 15 is a diagram illustrating an area where the output of the in-cylinder pressure sensor 5 is used in the program for knocking detection according to the fourth embodiment.

FIG. 15 is a diagram illustrating an area where the output of the in-cylinder pressure sensor 5 is used in the program for knocking detection according to the fourth embodiment (hereinafter, referred to as a "knocking gate area"). As illustrated in the figure, in the fourth embodiment, the program for knocking detection uses the output of the in-cylinder pressure sensor 5 in the range from the angle slightly before 0 degree to plus 60 degree. Hereinafter, for convenience, the crank angle corresponding to the starting point of the knocking gate area is referred to as $\theta 2$.

In the fourth embodiment, detection of existence or non-existence of preload loss abnormality in the in-cylinder pressure sensor 5 is performed with respect to the air amount detection area, the MFB calculation area, and the knocking gate area illustrated in FIGS. 13 to 15. Then, execution/stop of each program is switched in accordance with the grade of preload loss abnormality.

[Details of Process Performed by Fourth Embodiment]

Figure 16:
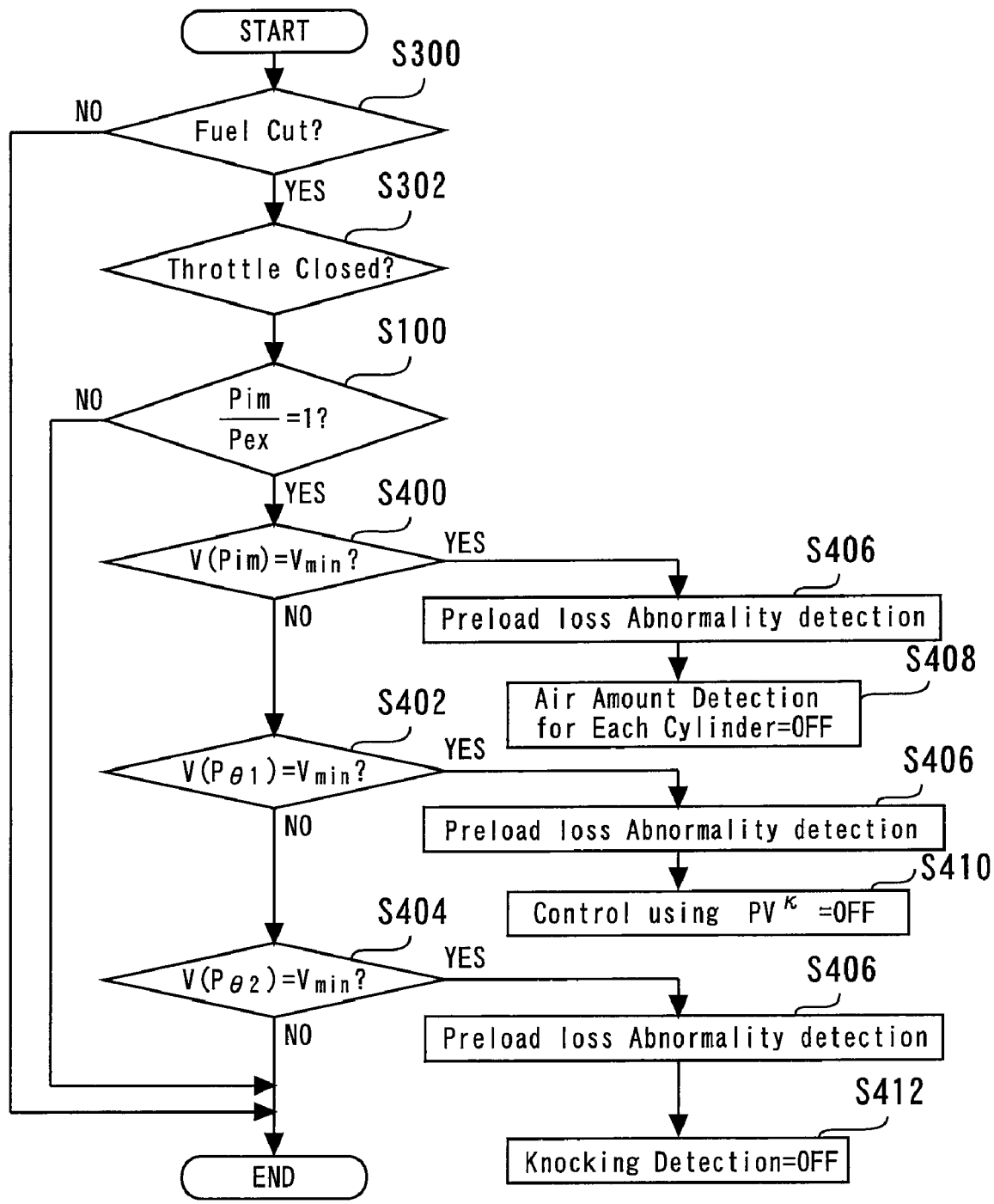
FIG. 16 is a flowchart illustrating a routine that is executed by the ECU 50 in the fourth embodiment.

A process according to the fourth embodiment will now be described in detail. FIG. 16 is a flowchart illustrating a routine that is executed by the ECU 50 in the fourth embodiment. In FIG. 16, step S100 is the same as that of the first embodiment, and steps S300 and S302 are the same as that of the third embodiment.

First, the routine of FIG. 16 comes to step S300 and S302. This makes it possible to judge whether or not the conditions for performing the highly accurate sign judgment are satisfied as in the third embodiment. If the conditions in step S300 and S302 for the sign judgment are satisfied, the routine comes to step S100 and the sign judgment using the ratio of Pim to Pex is performed. If the query in step S100 is answered "No", no sign of preload loss abnormality is found and the routine comes to the end.

If the condition of step S100 is satisfied, existence of the sign of preload loss abnormality is determined. In this case, the routine comes to step S400 and following processing.

Step S400 firstly performs a judgment about whether or not the voltage value V (Pim) is the same as the circuit limit value Vmin. If this condition is satisfied, preload loss abnormality may have occurred so as to prevent measurement of in-cylinder pressure of intake stroke. Accordingly, preload-loss-abnormality judgment routine is performed sequently (step S406). At this step S406, the routine of FIG. 8 described in the first embodiment is executed. If it is judged that preload loss abnormality has occurred, the air amount detection program is turned OFF (step S408). Thereafter, the routine comes to the end.

In the fourth embodiment, if the condition of step S400 is not satisfied, the routine sequently comes to step S402. Processing at the step S402 performs a judgment whether a voltage value V($P_{\theta 1}$) is the same as the circuit limit value Vmin. Here, an in-cylinder pressure at the crank angle θ1 is referred to as $P_{\theta 1}$ and the voltage value V ($P_{\theta 1}$), which is obtained from the in-cylinder pressure sensor 5, means an output voltage used for computation of an in-cylinder pressure $P_{\theta 1}$. If this condition is satisfied, there is a possibility that preload loss abnormality may have occurred so as to prevent measurement of in-cylinder pressure which should be used as the basis of MFB calculation. Then, a routine for preload-loss-abnormality judgment is executed sequently (step S406). If the result of the judgment indicates that preload loss abnormality has occurred, the control program using PVk is turned OFF (step S410). Thereafter, the routine comes to the end.

In the fourth embodiment, if the conditions of step S402 is not satisfied, then the routine comes to step S404. This step S404 performs a judgment whether or not the voltage value V ($P_{\theta 2}$) equals to the circuit limit value Vmin. Here, an in-cylinder pressure at the crank angle θ1 is referred to as $P_{\theta 1}$ and the voltage value V ($P_{\theta 1}$), which is obtained from the in-cylinder pressure sensor 5, means an output voltage used for computation of an in-cylinder pressure $P_{\theta 1}$. If this condition is satisfied, there is a possibility that preload loss abnormality may have occurred so as to prevent measurement of in-cylinder pressure which should be used as the basis of the knocking detection program. Then, a routine for preload-loss-abnormality judgment is executed sequently (step S406). If the result of the judgment indicates that preload loss abnormality has occurred, the knocking detection program is turned OFF (step S412). Thereafter, the routine comes to the end.

According to the above processing, when preload loss abnormality is detected, use of the output of the in-cylinder pressure sensor 5 can be restricted as necessary. Specifically, the fourth embodiment can suppress undesirable situation where the above application programs use the in-cylinder pressure sensor output including the influence of preload loss abnormality. This makes it possible to suppress a harmful effect caused by the output of the in-cylinder pressure sensor 5 including the influence of preload loss abnormality in the control of the internal-combustion engine. As a result, the harmful effect to the operational state of the internal combustion engine arising from preload loss abnormality can be suppressed.

Besides, the fourth embodiment can permit such abnormalities if the influence of preload loss abnormality has occurred in an area where the above-mentioned various programs do not access. As a result, available outputs among the outputs from the in-cylinder pressure sensor 5 can be continuously used while suppressing the harmful effect to the operational state of an internal-combustion engine.

In the fourth embodiment, which has been described above, the ECU 50 corresponds to the "control means" according to the eleventh aspect of the present invention, the processing at steps S100 to S412 in the routine of FIG. 16 described above correspond to the "restriction means" according to the eleventh aspect of the present invention.

Further, in the fourth embodiment, which has been described above, the each application programs (a) to (c) corresponds to the "parameter computation means" according to the twelfth aspect of the present invention, the processing at steps S400, S402 and S404 in the routine of FIG. 16 described above correspond to the "influence judgment means" according to the twelfth aspect of the present invention. Also, in the fourth embodiment, which has been described above, the processings at steps S400, S402 and S404 in the routine of FIG. 16 described above correspond to the "sensor output use restriction means" according to the twelfth aspect of the present invention.

It should be noted that the routine of FIG. 16 according to the fourth embodiment is an example and other variations may be possible. For example, the processings after step S400, the processings after S402 and the processings after S404 may be concurrently executed after step S100 is completed. On the other hand, processing of S300 and S302 may be removed.

It should be noted that the fourth embodiment described above continues to use the output of the in-cylinder pressure sensor 5 if the grade of preload loss abnormality is slight, i.e., if the influence of preload loss abnormality has occurred outside of an area where the various above-mentioned application programs use as the basis. However, the present invention is not limited to this. For example, it is also possible to take an action in which the use of output from the in-cylinder pressure sensor 5 is equally forbidden over the whole crank angle in accordance with the judgment condition of preload loss abnormality, as necessary.

It should be noted that the routine of the detailed processing according to the above described embodiments performs compensation of output drift by reduction or cancelation when dead band is detected by the dead band detection in outputs from the in-cylinder pressure sensor 5 (the "sign judgment"). However, the present invention is not limited to this.

For example, the present invention can be applied in a case where, although differ from the first embodiment, reduction or cancelation of output drift is performed continuously (otherwise, for example, in every predetermined time, every predetermined crank angle, or every predetermined cycle) regardless of the existence or nonexistence of dead band occurrence in an in-cylinder pressure sensor. Besides, in case where a routine for reduction or cancelation of output drift is executed when other predetermined condition except for dead band appearance is satisfied, the present invention can also be applied.

Also in these cases, the processing for detection of existence of preload loss abnormality (specifically, in the above embodiments, the processing at S106, S108 and S110 in FIG. 8) may be executed on the basis of whether or not dead band exists in the output characteristic of an in-cylinder pressure sensor after reduction or cancellation of output drift. It should be noted that various techniques for determination of a timing (occasion, condition) of output drift reduction or cancelation are already known and, therefore, those various known techniques may be used.

Still more specifically, for example, a drift reset routine may be designed so that the drift reset processing at step S104 of the routine in FIG. 8 can be executed at predetermined intervals. Then, aside from the drift reset routine, a routine to execute the processings S106, S108 and S110 in FIG. 8 after reduction or cancellation of the output drift by that routine is also prepared. Otherwise, in order to execute the processing of S106, S108 and S110 in FIG. 8 at a next step of drift reset, S106, S108 and S110 may be included in the drift reset routine.

Thereby, the existence of preload loss abnormality can be detected on the basis of whether or not dead band exists in the output characteristic of an in-cylinder pressure sensor after reduction or cancellation of output drift.

REFERENCE SIGNS LIST

1 Air cleaner
2 Throttle valve
3 Air flow meter
4 Surge tank
5 In-cylinder pressure sensor
6 Sparking plug
7 Fuel direct injection injector
8 Crank angle sensor
9 Knock sensor
10 Catalyst
11 Catalyst
20 Strain gage element
22 Housing
24 Housing
26 Transmission rod
28 Pressure sensing diaphragm
30 Circuit unit
30a Drift reset unit

The invention claimed is:

1. An abnormality detection device for an in-cylinder pressure sensor comprising:
   obtaining means for obtaining an output from the in-cylinder pressure sensor, the in-cylinder pressure sensor including an pressure sensing element, the pressure sensing element being provided with preload;
   output abnormality detecting means for detecting existence or nonexistence of dead band in output characteristic of the in-cylinder pressure sensor;
   drift reset means for performing reduction or cancellation of output drift of the in-cylinder pressure sensor; and
   preload loss abnormality detecting means for detecting existence or nonexistence of preload loss abnormality on a basis of existence or nonexistence of the dead band in the output characteristic of the in-cylinder pressure sensor after the drift reset means performs the reduction or the cancellation of the output drift.

2. The abnormality detection device for an in-cylinder pressure sensor according to claim 1, wherein
   the drift reset means includes abnormal circumstance drift reset means, the abnormal circumstance drift reset means performs reduction or cancellation of output drift of the in-cylinder pressure sensor when the output abnormality detecting means detects the existence or nonexistence of the dead band;
   the preload loss abnormality detecting means detecting existence or nonexistence of preload loss abnormality on a basis of existence or nonexistence of the dead band in the output characteristic of the in-cylinder pressure sensor after the abnormal circumstance drift reset means performs the reduction or the cancellation of the output drift.

3. The abnormality detection device for an in-cylinder pressure sensor according to claim 2, wherein
   the output abnormality detecting means detects, in the output characteristic, dead band that prevents measurement of at least one of intake pressure and exhaust pressure in a measurement target cylinder.

4. The abnormality detection device for an in-cylinder pressure sensor according to claim 1, wherein
   the drift reset means performs reduction or cancellation of output drift so that measurement of at least lower one of intake pressure and exhaust pressure becomes possible;
   the preload loss abnormality detecting means detecting existence or nonexistence of preload loss abnormality after the abnormal circumstance drift reset means performs the reduction or the cancellation of the output drift, on a basis of existence or nonexistence of dead band that prevents measurement of at least one of intake pressure and exhaust pressure in a measurement target cylinder.

5. The abnormality detection device for an in-cylinder pressure sensor according to claim 1, further comprising:
   intake stroke in-cylinder pressure obtaining means for obtaining intake stroke in-cylinder pressure, the intake stroke in-cylinder pressure being in-cylinder pressure in a measurement target cylinder in an intake stroke; and
   exhaust stroke in-cylinder pressure obtaining means for obtaining exhaust stroke in-cylinder pressure, the exhaust stroke in-cylinder pressure being in-cylinder pressure in the measurement target cylinder in an exhaust stroke; wherein
   the output abnormality detecting means includes pressure ratio abnormality detecting means, the pressure ratio abnormality detecting means detects the dead band on a basis of a ratio of the in-cylinder pressure and the intake stroke in-cylinder pressure.

6. The abnormality detection device for an in-cylinder pressure sensor according to claim 5, further comprising:
   condition judgment means for judging whether the internal combustion engine is under a condition that a difference of in-cylinder pressure in intake stroke and in-cylinder pressure in exhaust stroke is greater than the difference of normal operation condition; wherein
   the pressure ratio abnormality detecting means detects existence or nonexistence of the dead band in a case where the condition judgment means judges that the difference of in-cylinder pressure in intake stroke and in-cylinder pressure in exhaust stroke is greater.

7. The abnormality detection device for an in-cylinder pressure sensor according to claim 5, further comprising:
   fuel-cut detecting means for detecting whether or not a fuel-cut is performed in the internal combustion engine; and
   closing means for closing an intake passage of the internal combustion engine when the fuel-cut is performed; wherein the pressure ratio abnormality detecting means detects the dead band when the intake passage being closed.

8. The abnormality detection device for an in-cylinder pressure sensor according to claim 5, wherein
the output abnormality detecting means detects existence of the dead band on a basis of a result of detection by the pressure ratio abnormality detecting means and value of output or change of output from the in-cylinder pressure sensor in intake stroke.

9. The abnormality detection device for an in-cylinder pressure sensor according to claim 1, wherein
the preload loss abnormality detecting means detects existence or nonexistence of preload loss abnormality on a basis of a comparison of an output value from the in-cylinder pressure sensor after the reduction or the cancellation of the output drift by the drift reset means and an output limitation value being an upper limit value or a lower limit value of a range of output signal from the in-cylinder pressure sensor.

10. The abnormality detection device for an in-cylinder pressure sensor according to claim 1, wherein
the preload loss abnormality detecting means detects existence or nonexistence of preload loss abnormality on a basis of rate of change of output from the in-cylinder pressure sensor in intake stroke of a measurement target cylinder after the reduction or the cancellation of the output drift by the drift reset means.

11. A control apparatus for an internal combustion engine comprising:
an in-cylinder pressure sensor including a pressure sensing element, the pressure sensing element being provided with preload;
control means for controlling the internal combustion engine by using output from the in-cylinder pressure sensor;
the abnormality detection device for an in-cylinder pressure sensor according to claim 1; and
restriction means for restricting the control means to nonuse of output from the in-cylinder pressure sensor when preload loss abnormality in the in-cylinder pressure sensor is detected.

12. The control apparatus for an internal combustion engine according to claim 11, wherein
the restriction means includes parameter computation means, the parameter computation means computes a parameter relating to control of the internal combustion engine by using a part of output from the in-cylinder pressure sensor, and
the restriction means including:
influence judgment means for judging whether influence of preload loss abnormality exists in the part of output used by the parameter computation means, and
sensor output use restriction means for performing, in case where the influence of preload loss abnormality exists in the part of output used by the parameter computation means, prohibition of computation on a bases of the output from the in-cylinder pressure sensor in the parameter computation means or prohibition of control on a basis of the parameter computed by the parameter computation means.

13. An abnormality detection method for an in-cylinder pressure sensor, the in-cylinder pressure sensor including an pressure sensing element, the pressure sensing element being provided with preload, being characterized by: detecting existence or nonexistence of preload loss abnormality on a basis of existence or nonexistence of a dead band remaining in output characteristic of an in-cylinder pressure sensor after performing drift compensation to the in-cylinder pressure sensor.

14. An abnormality detection device for an in-cylinder pressure sensor comprising:
an obtaining unit for obtaining an output from the in-cylinder pressure sensor, the in-cylinder pressure sensor including an pressure sensing element, the pressure sensing element being provided with preload;
an output abnormality detecting unit for detecting existence or nonexistence of dead band in output characteristic of the in-cylinder pressure sensor;
a drift reset unit for performing reduction or cancellation of output drift of the in-cylinder pressure sensor; and
a preload loss abnormality detecting unit for detecting existence or nonexistence of preload loss abnormality on a basis of existence or nonexistence of the dead band in the output characteristic of the in-cylinder pressure sensor after the drift reset unit performs the reduction or the cancellation of the output drift.

15. A control apparatus for an internal combustion engine comprising:
an in-cylinder pressure sensor including a pressure sensing element, the pressure sensing element being provided with preload;
a control unit for controlling the internal combustion engine by using output from the in-cylinder pressure sensor;
the abnormality detection device for an in-cylinder pressure sensor according to claim 14; and
a restriction unit for restricting the control unit to nonuse of output from the in-cylinder pressure sensor when preload loss abnormality in the in-cylinder pressure sensor is detected.

* * * * *